United States Patent
Sri-Jayantha et al.

(10) Patent No.: US 6,549,349 B2
(45) Date of Patent: Apr. 15, 2003

(54) ADAPTIVE VIBRATION CONTROL FOR SERVO SYSTEMS IN DATA STORAGE DEVICES

(75) Inventors: Sri Muthuthamby Sri-Jayantha, Ossining, NY (US); Arun Sharma, New Rocelle, NY (US); Hien Phu Dang, Nanuet, NY (US); Naoyuki Kagami, Fujisawa (JP); Yuzo Nakagawa, Hiratsuka (JP); Akira Tokizono, Fujisawa (JP); Isao Yoneda, Yokoham (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/955,391

(22) Filed: Sep. 18, 2001

(65) Prior Publication Data

US 2002/0034036 A1 Mar. 21, 2002

Related U.S. Application Data

(63) Continuation of application No. 09/119,181, filed on Jul. 20, 1998, now abandoned.

(51) Int. Cl.[7] .............................................. G11B 27/36
(52) U.S. Cl. .................. 360/31; 360/98.01; 360/78.09; 360/77.02; 360/75; 360/65
(58) Field of Search ............................ 360/267.9, 98.01, 360/78.09, 78.04, 77.02, 75, 65, 31; 369/247, 215, 53.1, 53.14, 53.33; 711/114; 708/322, 323; 318/629, 611, 560, 632

(56) References Cited

U.S. PATENT DOCUMENTS 4,536,809 A  8/1985  Sidman
4,967,293 A  10/1990  Aruga et al.
4,980,625 A  12/1990  Shimda
5,400,196 A  3/1995  Moser et al.
5,608,586 A  3/1997  Sri-Jayantha et al.
5,636,193 A  6/1997  Ohmi
5,710,497 A  1/1998  Yanagimachi
5,880,955 A  3/1999  Matoba et al.

FOREIGN PATENT DOCUMENTS

| EP | 0 264 535 A2 | 4/1988 | ........... G11B/5/596 |
| EP | 0 306 715 B1 | 3/1989 | ........... G11B/33/08 |
| EP | 0 735 522 A1 | 2/1996 | |
| JP | 2565637 | 1/1994 | ........... G11B/33/08 |
| JP | 07272294 A | 10/1995 | ............ G11B/7/09 |

Primary Examiner—Alan T. Faber
(74) Attorney, Agent, or Firm—Marian Underweiser, Esq.; Wayne F. Reinke, Esq.; Heslin Rothenberg Farley & Mesiti P.C.

(57) ABSTRACT

Methods and systems for detecting and correcting for undesirable vibrations impacting the servo systems in data storage devices. A detection technique is provided wherein a detection filter is configured to scan a position signal of the servo system across a range of frequencies, and, at each respective scanned frequency, record an amplitude associated therewith. The recorded amplitudes are examined to determine whether any exceed a threshold, thereby locating a peak frequency of the vibration. Using the detected peak frequency of the vibration, a corrective filter is configured to operate about the peak frequency of vibration, thereby reducing its impact on the position signal in the servo system. Optimum detection and correction filter structures are disclosed, as are techniques for addressing filter state vectors as initial conditions as the corrective filters are repeatedly engaged during successive settle-out and track follow cycles (between seeks), as are continuous adaptation techniques for changing vibration environments.

100 Claims, 20 Drawing Sheets

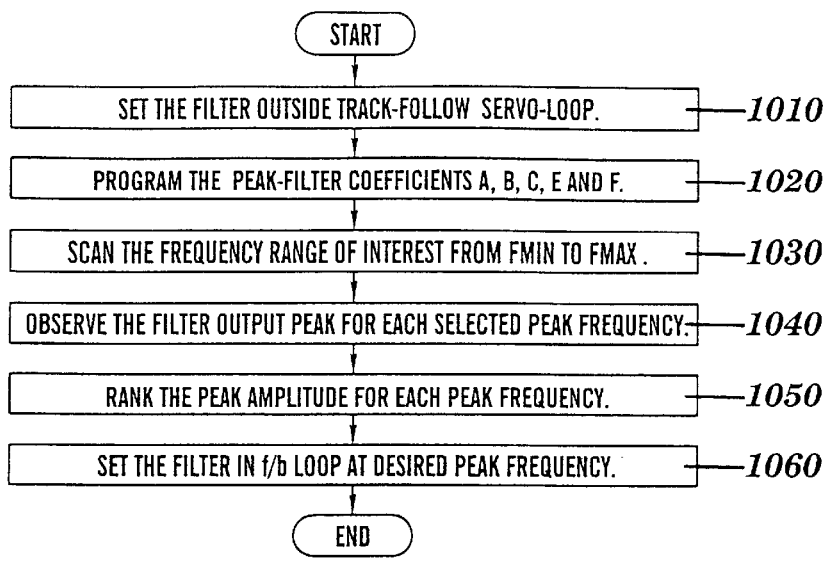
Fig. 7a
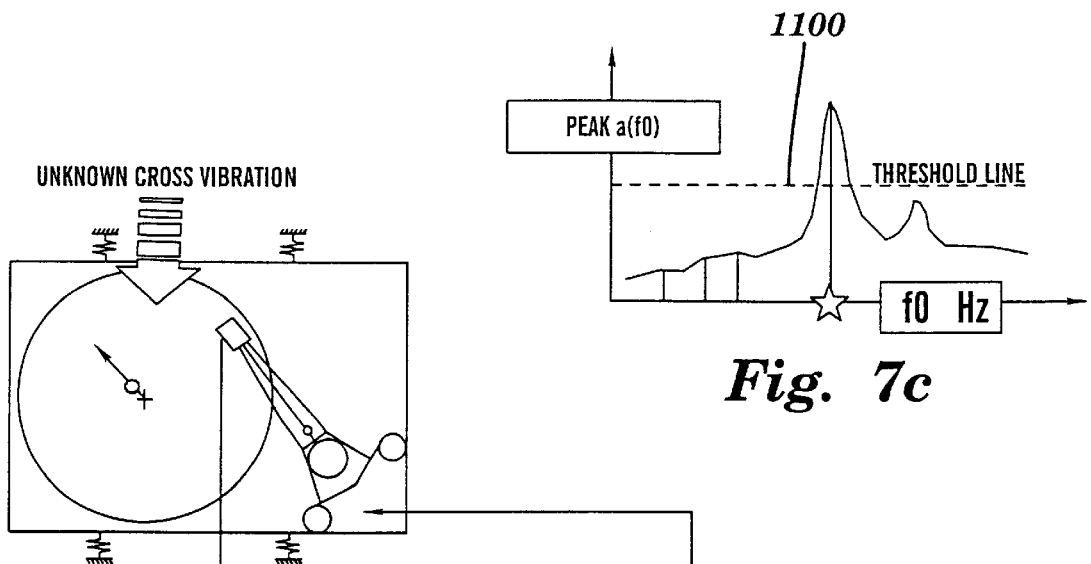
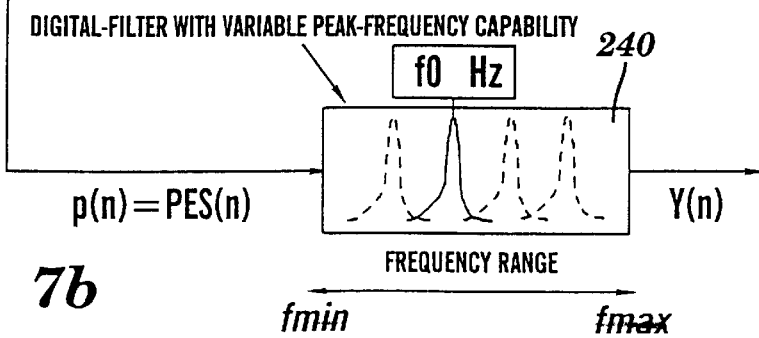
Fig. 7b
Fig. 7c

ADAPTIVE VIBRATION CONTROL FOR SERVO SYSTEMS IN DATA STORAGE DEVICES

TECHNICAL FIELD

This application is a continuation of U.S. patent application Ser. No. 09/119,181, filed on Jul. 20, 1998, now abandoned.

The present invention relates to data storage devices. More particularly, the present invention relates to techniques for correcting the adverse effects of vibrations on servo systems in data storage devices.

BACKGROUND OF THE INVENTION

With increases in track densities of Hard Disk Drives ("HDDs"), vibration sensitivity has become an acute problem. Present generations of HDDs at densities of 10,000 tracks per inch ("TPI") already exhibit poor settleout and/or track-follow characteristics when subject to external vibrations. In computer servers or arrays, where multiple disk drives are mounted in a frame, vibrations from one drive may substantially affect neighboring drives. At least three types of external vibration sources are known: 1) periodic with relatively constant peak amplitude arising from spindle imbalance; 2) non-periodic arising from reaction torque generated by an actuator seek motion; and 3) random vibrations resulting from other unpredictable external events. For example, CD-ROMs are known to produce vibrations which are periodic with gradually changing periodicity.

Conventional servo systems can reduce the track-follow error by about 20 to 30 dB using the basic servo loop error rejection property, but this level of error rejection is no longer sufficient to make HDDs immune from adverse vibration effects. This problem is expected to get worse with the accelerated growth of track densities in future products.

Present generation 2.5" and 3.5" direct access storage devices ("DASDs") are designed to operate in both portable and desk-top/server environments. In portable computers, the 2.5" DASDs are subject to harsh non-operating conditions, and moderate operating conditions. On the other hand, desk-top 3.5" DASDs are not subject to as much non-operating shock. However, desk-top/server DASDs often operate in the presence of multiple vibration sources associated with other drives in a s ingle computer frame.

Mechanical components such as spindle motor assemblies are not perfectly mass balanced, and may produce harmonic vibrations during operation. Harmonic vibrations produce both a linear and a rotational oscillatory motion of the entire system. At the 10 kTPI design point, a rotational oscillatory motion of a track with respect to the actuator pivot of about 0.01 thousandth of an inch (0.25 micrometer) corresponds to 10% of the track pitch. When not compensated, a track-follow error of 10% of track pitch can be detrimental to a drive's soft and hard error rate performance.

An HDD with a rotary actuator system is highly sensitive to rotational vibrations of the base plate. Using special shock and vibration isolation mount designs, the rotational oscillatory components due to internal spindle forcing can be minimized as disclosed in U.S. Pat. No. 5,400,196. A mount design optimized for intern al spindle vibration decoupling as in U.S. Pat. No. 5,400,196 is still susceptible to external vibrations. By deploying isolation mounts along a polygon satisfying a particular set of criteria (as taught by Japanese Patent No. 2,565,637) the externally generated vibration can also be decoupled. However, it is often a challenge to convince customers to implement special mount designs to compensate for manufacturing imperfections of HDDs.

As discussed above, present track density is about 10 kTPI, and is expected to grow exponentially with time. Positioning the read/write elements over small tracks is therefore a major challenge, especially in the presence of vibrations. Servo systems are used for positioning, and perform three critical tasks: 1) they move the head to the vicinity of a target in a minimum time using a velocity servo under seek mode; 2) they position the head on the target track with minimum settleout time using a position controller without an integrating element in it; and 3) the servo system enters the track-follow mode with a proportional-integral-derivative type ("PID") position controller.

Magnetically recordable tracks are set to move at a constant tangential velocity during operation of an HDD by the spindle motor system. Due to bearing imperfection as well as mechanical vibration of the HDD platform, the tracks may tend to move in the radial direction as well. The read/write ("R/W") elements are transported primarily along the radial direction of a disk platter thus providing an ability to follow the radial movement of the tracks. The position error signal ("PES") generated from the servo sectors of a disk by the read head represents the relative error between the two mechanically moving objects, i.e., the track and the R/W head. The PES contains repeatable and non-repeatable components. The repeatable component can further be classified into short term repeatable and long term repeatable categories. Feedback or feedforward solutions take advantage of the repeatable property of the PES to formulate innovative servo solutions. A feedback (U.S. Pat. No. 5,608,586) or feedforward (U.S. Pat. No. 4,536,809) solution can be considered to compensate for repeatable track-follow error components. When a repeatable run out component frequency is known a-priori, a digital servo algorithm can be designed and embedded in a product servo microcode to suppress the position error component at the vibration frequency. The run out at this frequency can result from either a physical shift of a disk with respect to its axis of rotation or from self vibration created by spindle motor mass imbalance. As described in U.S. Pat. No. 5,608,586, a robust servo solution, including optimum initial condition setup to operate a digital filter, solves the disk shift problem with minimum settleout time penalty. A disk shift due to shock can be considered long term repeatable as it is affected by the occasional shock.

However, when a frequency of cross vibration is unknown, such as that associated with another HDD in the same frame, a servo algorithm according to U.S. Pat. No. 5,608,586 cannot be designed and embedded in the drive prior to shipment. This problem must be addressed in any effective cross vibration solution. Further, any solution should be implemented without major computational requirements since the cost constraints of HDDs usually preclude the use of a dedicated digital signal processor ("DSP") to perform complex or long arithmetic functions.

What is required, therefore, are techniques to compensate for vibrations encountered in disk drives, which are adaptive to the frequencies of the vibrations, and which can be implemented without using complex computing hardware.

SUMMARY OF INVENTION

The present invention solves the periodic, cross vibration problem by implementing a two step algorithm which first detects the dominant cross vibration frequency, and then configures an optimal servo feedback solution. The information gathered during the detection process is used to configure a digital peak filter. The filter coefficients are tuned to compensate for the detected periodic vibration induced error. The servo algorithm uses a frequently updated initial condition vector to minimize the settleout time encountered due to the transient dynamics of the digital filter. Advantageously, no trigonometric computations, such as FFTs, are invoked in one aspect of the present invention, during the determination of the cross vibration frequency. Hence a low cost implementation in a microprocessor-based or specialized chip-based HDD servo control system is provided by the present invention.

In that regard, the present invention relates, in one aspect, to techniques for reducing the effect of a vibration on a position signal in a servo system of a data storage device. The servo system controls the position of an access element with respect to a medium mounted for movement in the data storage device. The technique involves detecting, during operation of the data storage device, a frequency of the vibration. An exemplary detection filter scans the position signal across a range of frequencies, and, at each respective scanned frequency, records an amplitude associated therewith. The recorded amplitudes are then examined to determine whether any exceed a threshold, thereby locating the corresponding frequency of the vibration.

Once the frequency of vibration is determined, a corrective filter is configured to reduce the effect of the frequency of the vibration on the position signal. The corrective filter is configured to operate at the detected frequency of the vibration, in accordance with a plurality of filter coefficients determined as a function of the detected frequency of the vibration.

In one exemplary embodiment, the corrective filter may be of the form $$Y(n)=Ap(n)+Bp(n-1)+Cp(n-2)-EY(n-1)-FY(n-2).$$

To ensure that the intermediate nodes of the filter operate within the allowable dynamic range of the processing, various filter structures are disclosed herein.

The filter may be used alone, or in addition to other filters, which may correct for, for example, self-vibration from the data storage device. Since the filters may only be engaged during settle-out/track follow mode, techniques for accessing the filter state vectors, as initial conditions, must be provided. In that regard, the present invention relates to, in another aspect, repeatedly engaging the filters, including repeatedly accessing filter state vectors as a function of the frequency of the vibration from the sources internal or external to the data storage device. These filter states may be refreshed periodically with corresponding outputs from the filter (in one example, about every 5 to 10 periods of the vibration). Separate counters may be maintained (M and N) to access the respective filter state vectors. The counters wrap at an index corresponding to the detected frequency of the vibration, thereby allowing the filter to access its filter state vectors, as initial conditions, as the filter is repeatedly engaged during settle-out/track-follow.

To account for changing vibration conditions, the present invention relates to, in another aspect, repeatedly detecting, during operation of the data storage device, a frequency of vibration and repeatedly configuring the corrective filter to operate at the detected frequency.

By utilizing the dual approach of first detecting, and then correcting for frequencies of vibration, and by providing the novel filter implementation structures herein, the present invention provides a solution for vibrations in data storage devices. These vibrations are often unpredictable, and the frequencies of vibration must therefore be detected and accounted for during real-time operation of the system. Further, the present invention provides low processing cost solutions to these problems, i.e., avoids FFT processing techniques, for the detection and filtering processes disclosed herein.

BRIEF DESCRIPTION OF THE DRAWINGS

FIG. 1b is a time plot of the position error signal ("PES") of one of the drives of FIG. 1a;

FIG. 2b is a time plot of the improved PES for the drive of FIG. 2a;

FIG. 7a is a flow diagram of the steps necessary to detect the vibration frequency of interest f0, in accordance with the present invention;

FIG. 7b depicts an exemplary configuration of the system for detecting the vibration frequency of interest f0, in accordance with the present invention;

FIG. 7c is an amplitude vs. frequency plot of the results of the detection process used to detect the vibration frequency of interest f0);

FIG. 16b is a time plot of the PES associated with the drive of FIG. 16a;

DETAILED DESCRIPTION OF THE PREFERRED EMBODIMENT(S)

Figure 1A:
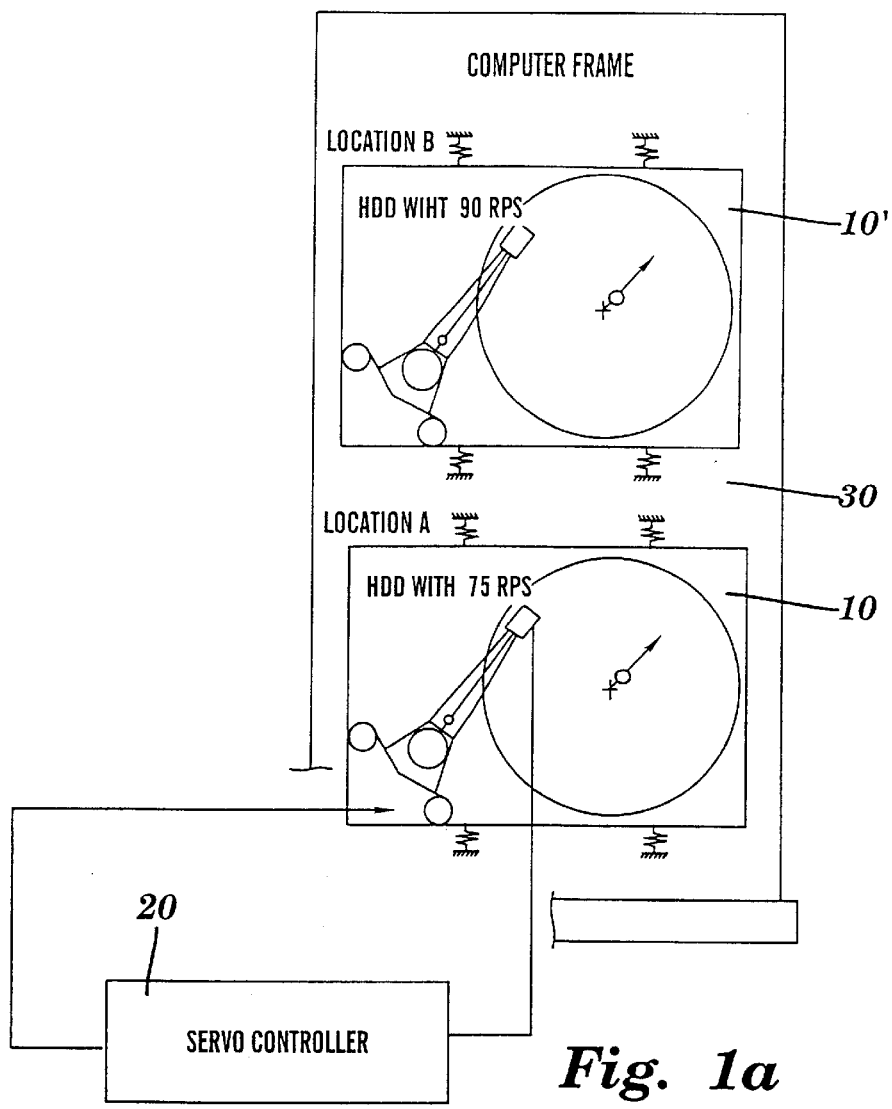
FIG. 1a depicts a computer frame having two disk drives with different, respective revolution speeds.
Figure 1B:
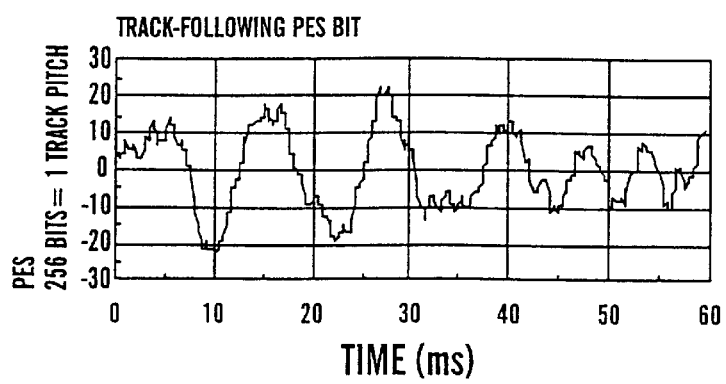

FIG. 1a depicts two disk drives 10 and 10' with distinct rotational frequencies, located in the same computer frame. The drive 10 of interest to the designer is located in position A and is subject to self-vibration at 75 revolutions per second ("rps") spindle speed. A second drive 10' at location B, which may be supplied by another vendor, operates independently, and the drive 10 designer cannot be expected to have any prior knowledge of its frequency components. Drive 10' generates a 90 rps cross vibration component in the computer frame due to its 90 rps spindle speed, and therefore disturbs the track follow performance of drive 10. The disturbed PES trace of drive 10 is depicted vs. time in FIG. 1b, and contains both 75 Hz and 90 Hz components, as well as a beat component.

Figure 2A:
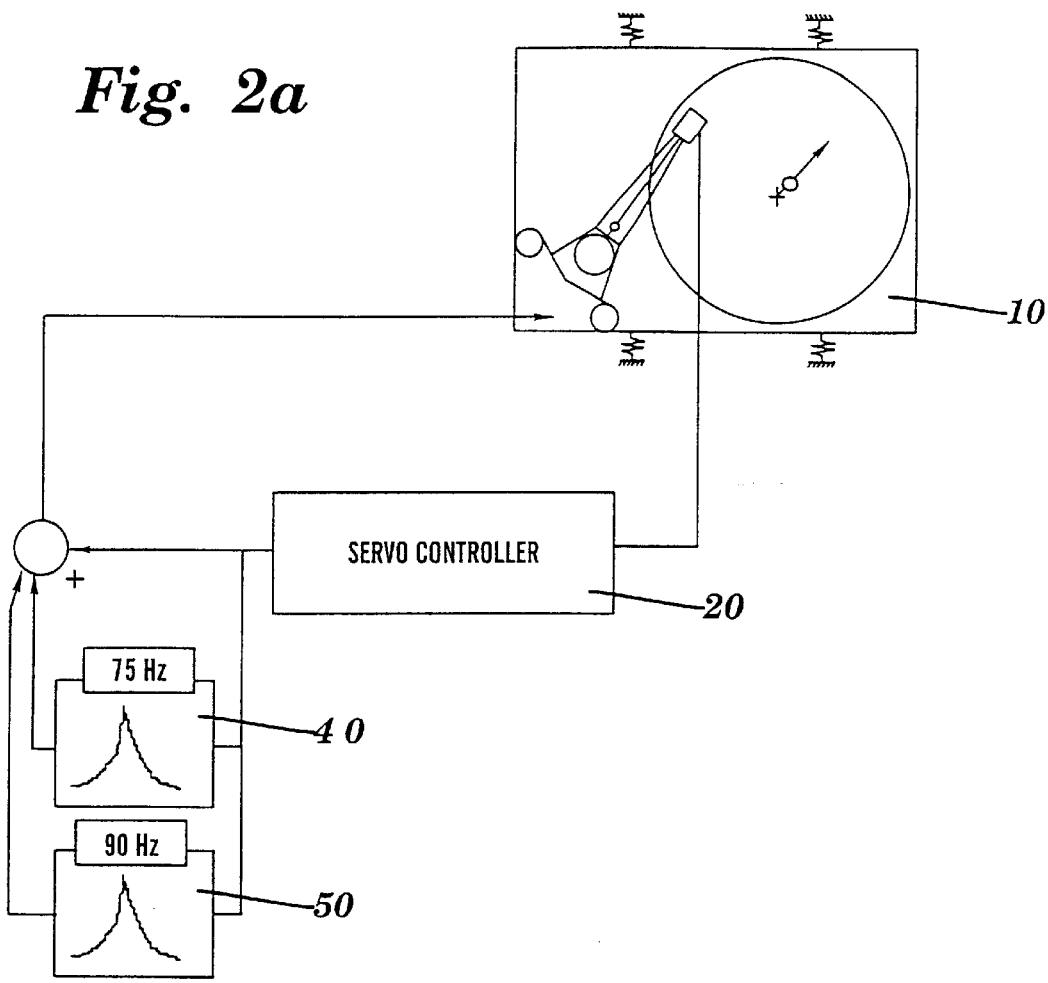
FIG. 2a depicts a drive of interest 10 having digital peak filters for self and cross vibration frequency components, respectively.
Figure 2B:
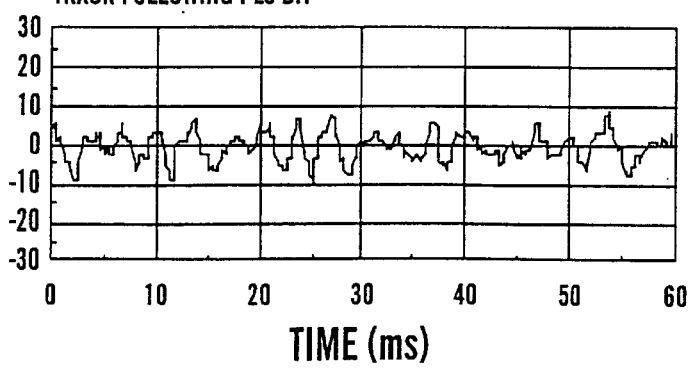

The vibration errors in track-follow mode can be addressed by implementing first and second sets of digital filters in the servo loop designed to have peak gains at 75 and 90 Hz, respectively. FIG. 2a shows such a system having two fixed frequency peak filters 40 and 50 simultaneously running in parallel to each other, but together in series with the servo controller 20. Filter 40 is designed with peak gain of 30 dB at 75 Hz, and filter 50 has a similar gain at 90 Hz. The resulting PES trace of FIG. 2b demonstrates that the variability is reduced by this servo configuration without causing any control system instability.

Two main challenges to the realization of a solution to periodic cross vibrations in such a product environment exist. First, the designer of drive 10 has no a-priori knowledge of the vendor drive 10' that may be placed in location B of the computer frame. Therefore the information about its spindle rotation speed (here 90 rps) is not known until the customer configures the system. Second, the characteristics of the cross vibration component are no longer locked to the self rotation frequency of drive 10 in location A. Therefore, a technique to address the filter initial condition value as a function of drive 10's sector number is required. Further, it was found through experiments that the filter state continuously drifts with time at a rate much faster than that corresponding to the self vibration case. The sensitivity of the filter state to the cross vibration environment is also affected by the filter properties.

In accordance with the present invention, the solution to these cross vibration problems involves the following technique:

Step 1: Off-Line Design of a Programmable Digital Peak Filter

In accordance with the present invention, during the development phase of an HDD (i.e., off-line), the servo system is designed with the required flexibility so that when it is embedded into the product microcode and shipped to the customer, it will have on-line adaptive capabilities. A fixed second order digital peak filter is proposed herein which has 5 fixed coefficients. The objective is to design a filter formulation that will represent the 5 coefficients as a function of a single parameter associated with the targeted peak gain frequency. A particular peak filter characteristic should be chosen which is effective for cross vibration cancellation. Through experimental studies it was determined that a second order peak filter with a 30 dB peak value and a half-gain bandwidth of about 5% of peak frequency was the most robust. Higher bandwidths are even better, but they may produce excessive phase lag detrimental to servo stability.

The proposed fixed frequency second order digital filter has the following, exemplary structure:

$$Y(n)=Ap(n)+Bp(n-1)+Cp(n-2)-EY(n-1)-FY(n-2) \qquad (1)$$

where the fixed coefficients A, B, C, E and F determine the properties of the filter, Y(n) is the filter state (as well as the output) corresponding to a servo sector number n, and p(n) is the input. The filter's coefficients may be computed by the servo system designer off-line and programmed into the microcode prior to the product shipment. However, in accordance with the present invention, the filter coefficients A, B, C, E and F are analytically derived to be functions of a single parameter represented by the cross vibration frequency of interest, f0. Therefore, the digital peak filter is represented as follows:

$$Y(n)=A(f0)p(n)+B(f0)p(n-1)+C(f0)p(n-2)-E(f0)Y(n-1)-F(f0)Y(n-2)$$

where the coefficients A(f0), B(f0), C(f0), E(f0) and D(f0) are represented as a function of f0, and where the parameter f0 is selected according to the frequency of cross vibration, i.e., the frequency at which the peak gain is desired. (The terms f, f0, f*, and the term "frequency" itself are broadly used herein to denote either actual, physical frequencies of interest, or parameters which bear some sort of relationship to the actual, physical frequency of interest.) In choosing the analytical functions, the goal is to avoid any trigonometric or exponential computations so that a low cost MPU or special semiconductor chip can be employed, rather than a high performance (and high cost) digital signal processing chip.

The parameter f0 will in practice have a minimum value $f_{min}$ and a maximum value $f_{max}$ depending upon the anticipated cross vibration environment. For example, present generations of disk drives have spindle speeds anywhere from 3600 rpm (60 Hz) to 10,000 (166 Hz). Hence a conservative range for f0 can correspond to a peak frequency located between about 50 Hz and 180 Hz. In certain mount configurations, the second harmonic can also become substantial, and $f_{max}$ can be extended to cover this component as well.

Using an exemplary, bilinear transformation method of obtaining a digital filter from an analog filter, it was found that one could develop a non-trigonometric function for each of the coefficients of Eq. (2). This is a key step towards archieving a programmable filter for a low cost HDD implementation. In a DSP environment, a designer will be tempted to use an FFT method to detect the peak frequency, which would be very computationally burdensome to a low cost MPU-based servo system since it involves many sine and cosine computations. The objective herein is to avoid such complex computations.

A tested example is as follows:

Peak filter h(s) is proposed where s is the standard Laplace variable and where:

$$h(s) = (s^2 + 2Z_a w_a s + w_a^2)/(s^2 + 2Z_b w_b s + w_b^2) \quad (3)$$

where $w_a = 2\pi f_a$ $w_b = 2\pi f_b$ $f_a$ = undamped natural frequency of numerator $f_b$ = undamped natural frequency of denominator $Z_a$ = damping term for numerator $Z_b$ = damping term for denominator Using a bilinear transformation of the form $$s = (2/T)(1 - z^{-1})/(1 + z^{-1}) \quad (4)$$

where z is the delay operator and T is the sampling time, the analog domain transfer function can be transformed to a discrete domain form. Note that the frequency parameters $f_a$ and $f_b$ are related to the desired peak frequency. The simplest case is where fb=fa=f0. In certain cases the dependency of $f_a$ and $f_b$ on f0 can be set to a linear or higher order function of f0 or else offset by an appropriate number. So long as trigonometric relationships or fractional exponential factors are not used, the transformation will produce a low cost MPU implementation.

Once the transformation is completed, the new discrete domain transfer function equivalent is represented as:

$$H(z) = [A(f0) + B(f0)z^{-1} + C(f0)z^{-2}]/[1 + E(f0)z^{-1} + F(f0)z^{-2}] \quad (5)$$

(For simplicity a single delay operator $z^{-1}$ may be denoted herein as z1 and double delay operator $z^{-2}$ as z2.) It can be proved through substitution of Eq. (4) into Eq. (3) that the coefficients of Eq. (5) are as follows:

Let:

fs = Sampling frequency (Hz) (=1/T)

f* = f0/fs (Normalized peak frequency)

$a1 = 2\pi Z_a f^*$ $a2 = (\pi f^*)^2$ \quad (6)

$b1 = 2\pi Z_b f^*$ $b2 = (\pi f^*)^2$ then $D = [1 + b1 + b2]$ $A = [1 + a1 + a2]/D$ $B = [-2 + 2(a2)]/D$ \quad (7)

$C = [1 - a1 + a2]/D$ $E = [-2 + 2(b2)]/D$ $F = [1 - b1 + b2]/D$ where each coefficient A, B, C, D, E and F is now an explicit function of f0. The natural frequency for the numerator (fa) and denominator (fb) are set to f0. If a general formulation is desired, then a1, a2, b1 and b2 can be represented as distinct parameters of damping as well as natural frequency in Eq. (6), and the formulation for the filter coefficients still remains the same as in Eq. (7).

Figure 3:
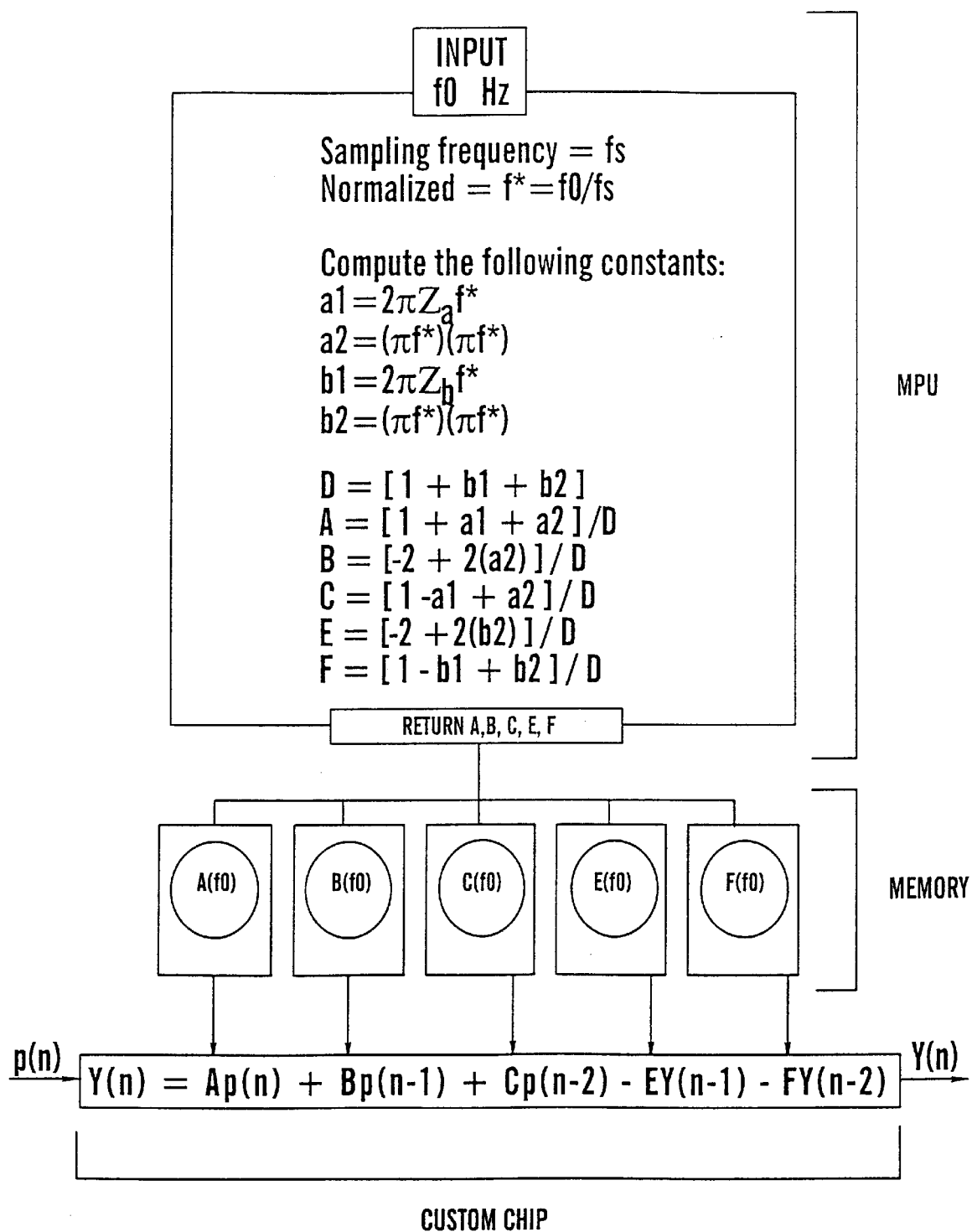
FIG. 3 depicts an exemplary computation sequence for the generation of digital peak filter coefficients A, B, C, E and F as a function of the frequency of interest f0, in accordance with the present invention.

It is understood that the analog peak frequency when transformed into digital domain undergoes a frequency warp. This warp effect is well known and can be accounted for using a table lookup, or it may not even be relevant. It was found that normalizing the frequency f0 by a fixed frequency term fn, the numerical sensitivity of implementing the desired filter characteristics could be improved. With 16-bit arithmetic, normalization was not necessary. FIG. 3 shows an example of the computational sequence required to set the digital peak filter coefficients, A, B, C, E and F, as described above, in an exemplary custom chip with associated memory and MPU. Because there may be some a-priori knowledge about the range of frequencies over which the corrective filter may operate, it may be preferable to pre-calculate and store a set of coefficients for each frequency within the range, and, during operation, when a particular cross vibration frequency is detected, selecting the corresponding set of coefficients, in a look-up table fashion.

Step 2: Optimum Corrective Filter Structure for Low Cost Implementation

The corrective filter designed with the coefficients A, B, C, D, E and F computed by a low cost MPU or a specialized integrated chip must now be structured in an optimal configuration. The peak filter not only needs to reduce the PES error at a desired frequency but also should allow free flow of control signals generated by the track-follow controller and/or any other filter operating simultaneously on the intermediate control signals. This requirement imposes constraints on internal DC/AC gains and computational ranges of the implementation of the filter.

Internal DC gain of a filter determines the bias value of the filter state for a DC input. One purpose of the track-follow control signal is to provide a bias command through a voice coil motor ("VCM") current driver so that the actuator can be placed at various track positions against the forces generated by the flexible cable, aerodynamic drag, and pivot hysteresis. Therefore, the peak filter should allow the bias current command to remain continuous without any delay or distortion during seek to settle mode switching. At a minimum, the overall input/output DC gain must be unity. If this property is not assured, then transients in the settleout phase are introduced thereby producing prolonged settleout dynamics. The internal DC can therefore become exceedingly high, sometimes on the order of 1000, if the structure is not optimally selected. This means that a 1-bit bias command will require the filter to have an internal state equivalent to 1000 bits. In a typical product the bias current command is about 30-bit maximum. Therefore the filter will have to reach an internal value of 30,000 bits just to allow the DC value to pass through without distortion resulting from internal arithmetic saturation or overflow. Such a condition can be easily reached when the internal AC component is superimposed on the DC value.

Since the filter's main function is to provide a compensating periodic control signal at the frequency of cross vibration, it can be expected to have a substantial amplitude on its output signal as well as on its internal state. Since it is a requirement to keep the fixed point arithmetic precision to the minimum number of bits to save chip or MPU cost, it is necessary to select a filter structure that will have not only a low internal DC gain but also a moderate AC gain on its internal state without modifying the filter's peak characteristics. A moderate AC gain is required so that the internal states are properly handled in the computation process: too high of a gain can cause numerical overflow and too low of a gain can cause underflow.

Figure 4A:
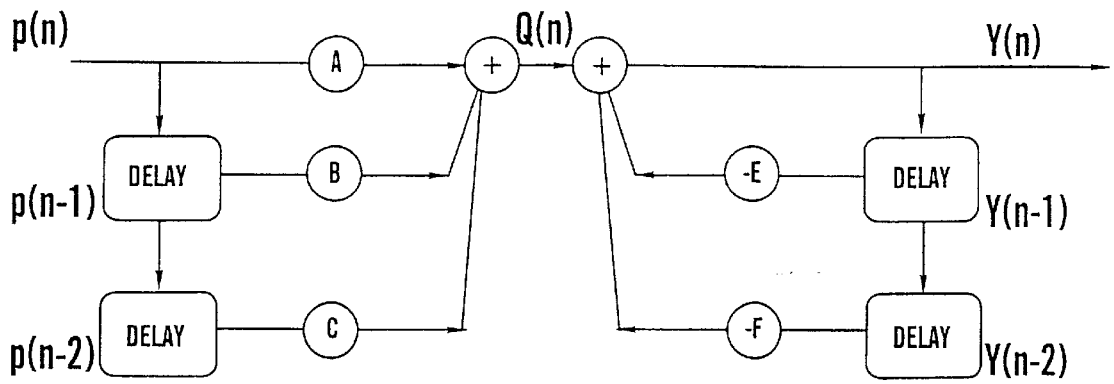
FIGS. 4a–g depict different digital filter structures proposed to correct cross vibration frequency components in accordance with the present invention.

In FIGS. 4a–g, seven second order potential digital filter structures are disclosed, respectively, in accordance with the present invention, which all provide the same Y(n) output, discussed above. However, these structures differ in their handling of DC bias, and internal gains, as discussed further below. The first three structures, Case-A, Case-B and Case-C, are "Direct Form" realizations I, II and III in which the transfer function parameters are directly associated with the filter structure. The last four structures, Case-D, Case-E, Case-F and Case-G, are "Bias Free Direct Forms" I, II, III and IV. In these structures, the filters have an explicit parallel path with unity gain which allows the DC and all other frequency components to pass through without any distortion, and the peak filter portion that forms the parallel branch enhances the input signal at the targeted peak frequency only. Therefore the filter internal states are not critical to preserve the bias value. This is potentially an advantage with regard to MPU computational range requirements. FIGS. 4a–g have associated therewith the following transfer functions, respectively:

Case A: Direct Form I (FIG. 4a)

$$Q(n) = Ap(n) + Bp(n-1) + Cp(n-2)$$

$$Y(n) = Q(n) - EY(n-1) - FY(n-2) \text{ and}$$

$$Q(z)/p(z) = [A + Bz^{-1} + Cz^{-2}]$$

$$Y(z)/Q(z) = 1/[1 + Ez^{-1} + Fz^{-2}]$$

$$Y(z)/p(z) = [Y(z)/Q(z)][Q(z)/p(z)]$$
$$= [A + Bz^{-1} + Cz^{-2}]/[1 + Ez^{-1} + Fz^{-2}]$$

Figure 4B:
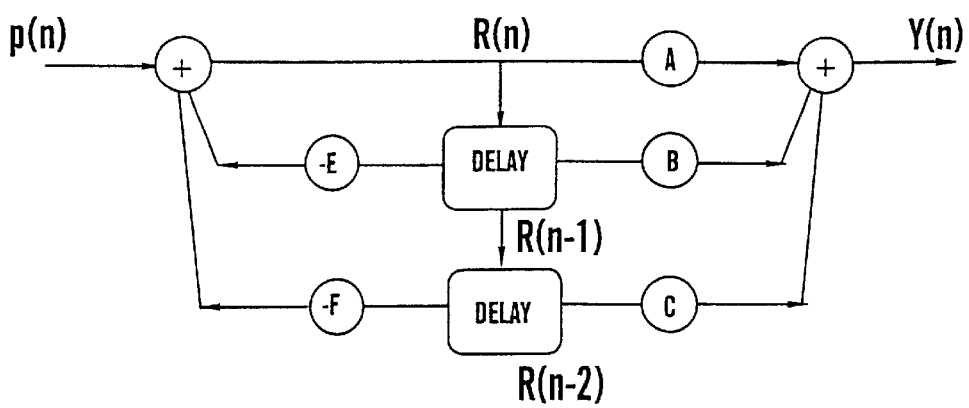

Case B: Direct Form II (FIG. 4b)

$$R(n) = p(n) - ER(n-1) - FR(n-2)$$

$$Y(n) = AR(n) + BR(n-1) + CR(n-2) \text{ and}$$

$$R(z)/p(z) = 1/[1 + Ez^{-1} + Fz^{-2}]$$

$$Y(z)/R(z) = [A + Bz^{-1} + Cz^{-2}]$$

$$Y(z)/p(z) = [A + Bz^{-1} + Cz^{-2}]/[1 + Ez^{-1} + Fz^{-2}]$$

Figure 4C:
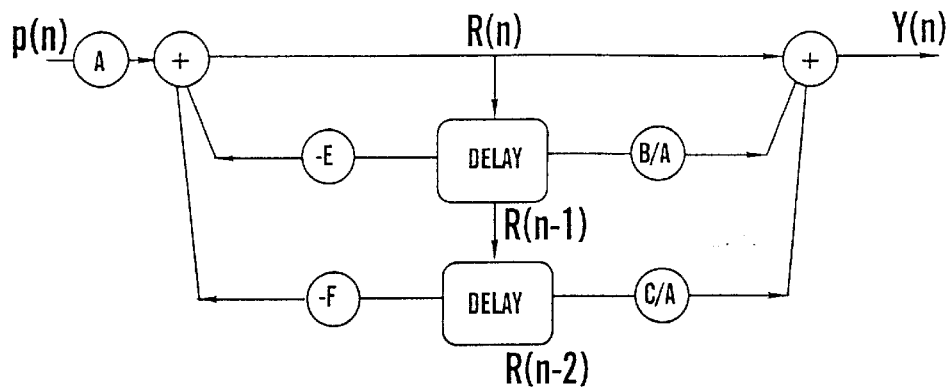

Case C: Direct Form III (FIG. 4c)

$$R(n) = Ap(n) - ER(n-1) - FR(n-2)$$

$$Y(n) = R(n) + (B/A)R(n-1) + (C/A)R(n-2) \text{ and}$$

$$R(z)/p(z) = A/[1 + Ez^{-1} + Fz^{-2}]$$

$$Y(z)/R(z) = [1 + (B/A)z^{-1} + (C/A)z^{-2}]$$

$$Y(z)/p(z) = A[1 + (B/A)z^{-1} + (C/A)z^{-2}]/[1 + Ez^{-1} + Fz^{-2}]$$

Figure 4D:
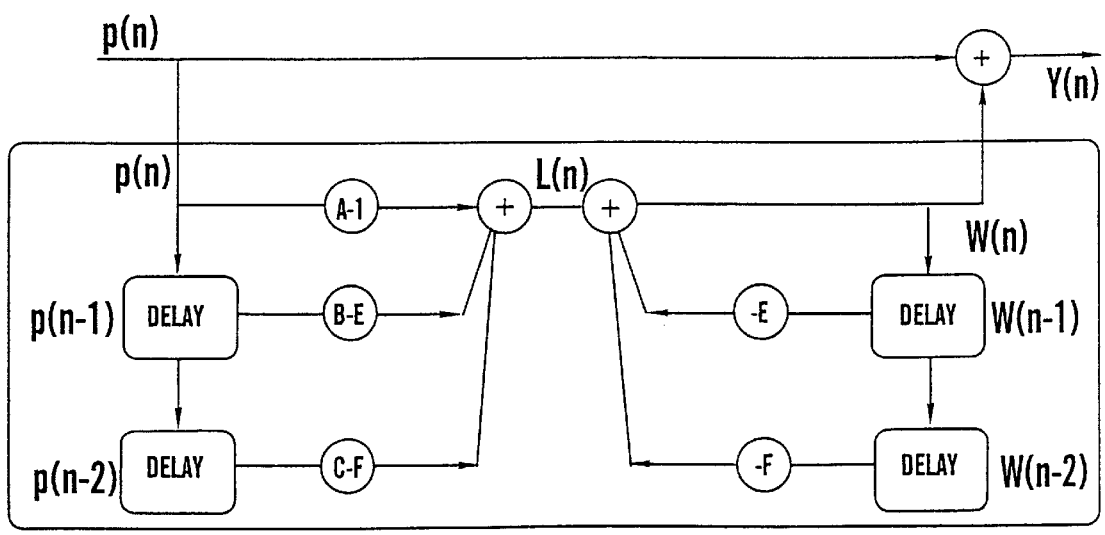

Case D: Bias Free Direct Form I (FIG. 4d)

$$L(n) = (A-1)p(n) + (B-E)p(n-1) + (C-F)p(n-2)$$

$$W(n) = L(n) - EW(n-1) - FW(n-2)$$

$$Y(n) = p(n) + W(n) \text{ and}$$

$$L(z)/p(z) = [(A-1) + (B-E)z^{-1} + (C-F)z^{-2}]$$

$$W(z)/L(z) = [1/(1 + Ez^{-1} + Fz^{-2})]$$

$$Y(z)/p(z) = [1 + W(z)/p(z)] = [1 + \{W(z)/L(z)\}\{L(z)/p(z)\}]$$
$$= [1 + \{1/(1 + Ez^{-1} + Fz^{-2})\}\{(A-1) + (B-E)z^{-1} + (C-F)z^{-2}\}]$$
$$= [A + Bz^{-1} + Cz^{-2}]/[1 + Ez^{-1} + Fz^{-2}]$$

Figure 4E:
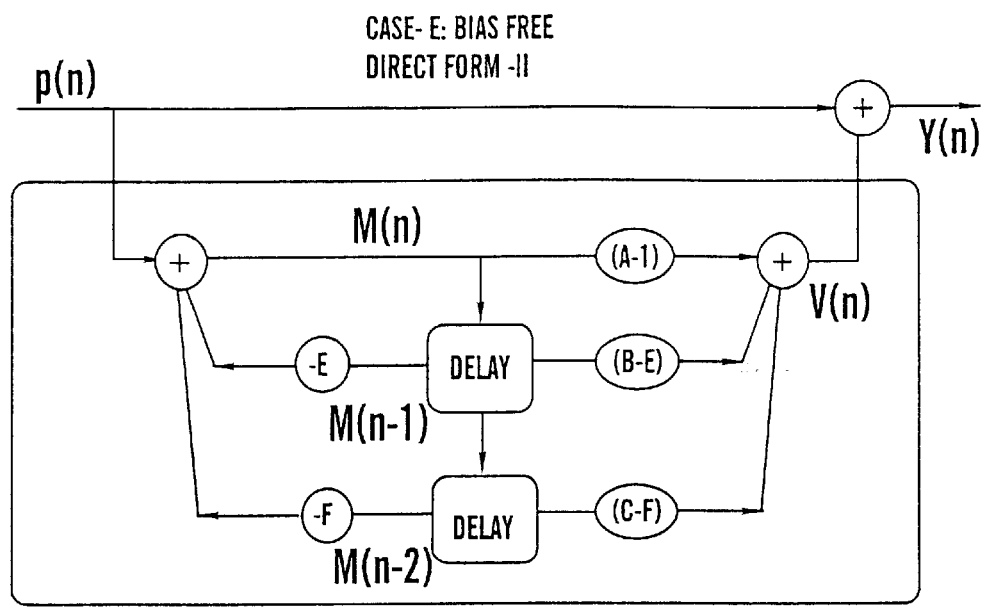

Case E: Bias Free Direct Form II (FIG. 4e)

$$M(n) = p(n) - EM(n-1) - FM(n-2)$$

$$V(n) = (A-1)M(n) + (B-E)M(n-1) + (C-F)M(n-2)$$

$$Y(n) = p(n) + V(n) \text{ and}$$

$$M(z)/p(z) = [1/(1 + Ez^{-1} + Fz^{-2})]$$

$$V(z)/M(z) = [(A-1) + (B-E)z^{-1} + (C-F)z^{-2}]$$

$$Y(z)/p(z) = [1 + V(z)/p(z)] = [1 + \{V(z)/M(z)\}\{M(z)/p(z)\}]$$
$$= [1 + \{((A-1) + (B-E)z^{-1} + (C-F)z^{-2})\}\{1/[1 + Ez^{-1} + Fz^{-2}]\}]$$
$$= [A + Bz^{-1} + Cz^{-2}]/[1 + Ez^{-1} + Fz^{-2}]$$

Figure 4F:
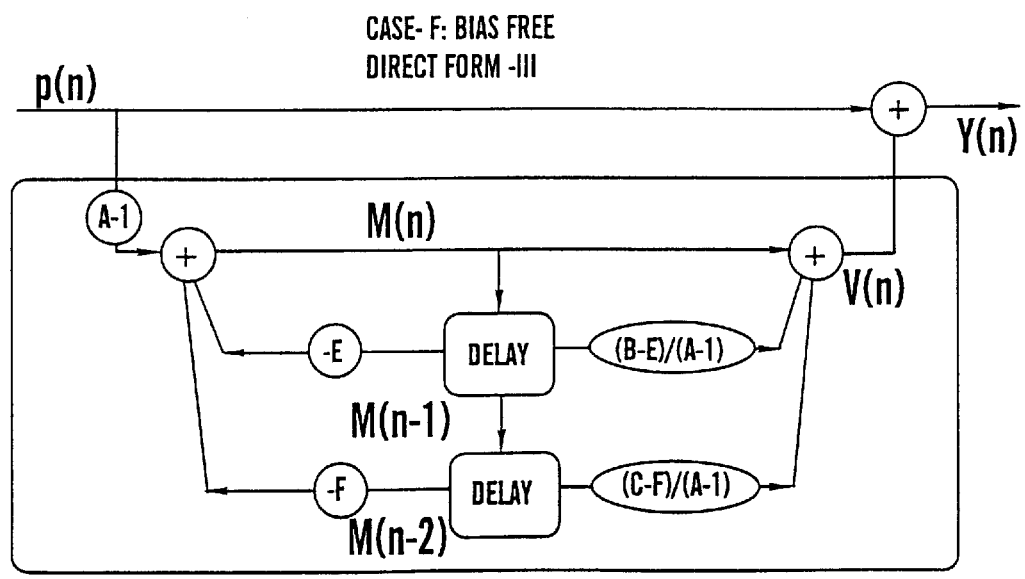

Case F: Bias Free Direct Form III (FIG. 4f)

$$M(n) = (A-1)p(n) - EM(n-1) - FM(n-2)$$

$$V(n) = M(n) + [(B-E)/(A-1)]M(n-1) + [(C-F)/(A-1)]M(n-2)$$

$$Y(n) = p(n) + V(n) \text{ and}$$

$$M(z)/p(z) = (A-1)/[1 + Ez^{-1} + Fz^{-2}]$$

$$V(z)/M(z) = [1 + (B-E)/(A-1)z^{-1} + (C-F)/(A-1)z^{-2}]$$

$$Y(z)/p(z) = [1 + V(z)/p(z)] = [1 + \{V(z)/M(z)\}\{M(z)/p(z)\}]$$
$$= [1 + \{1 + (B-E)/(A-1)z^{-1} + (C-F)/(A-1)z^{-2}\}\{(A-1)/[1 + Ez^{-1} + Fz^{-2}]\}]$$
$$= [1 + \{(A-1) + (B-E)z^{-1} + (C-F)z^{-2}\}/[1 + Ez^{-1} + Fz^{-2}]]$$
$$= [A + Bz^{-1} + Cz^{-2}]/[1 + Ez^{-1} + Fz^{-2}]$$

Figure 4G:
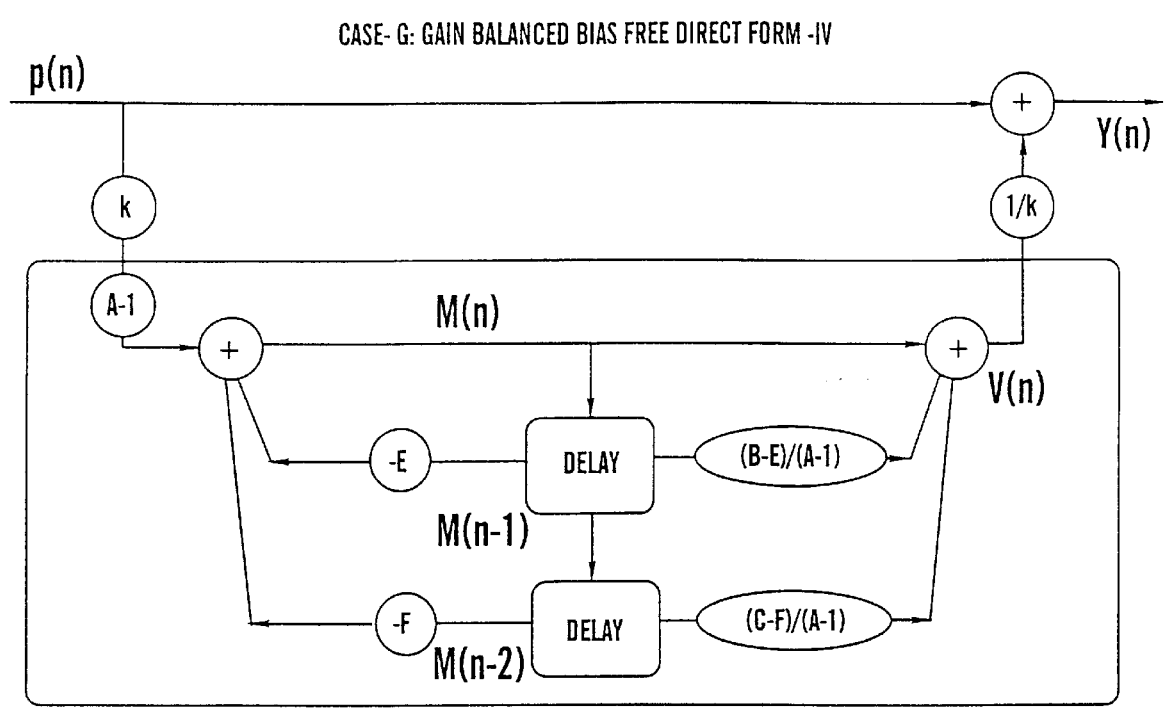
Figure 5A:
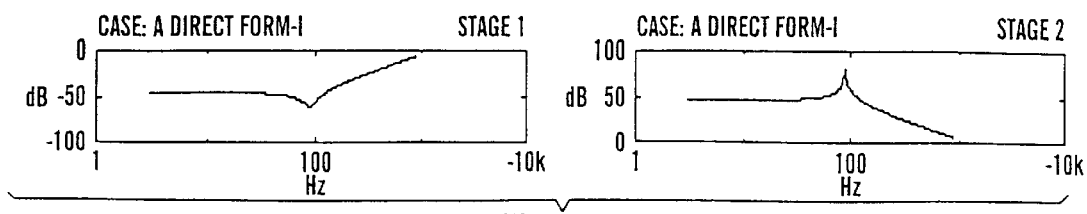
FIGS. 5a–g are spectral plots for first and second stages of each of the filter structures of FIGS. 4a–g, respectively.
Figure 5B:
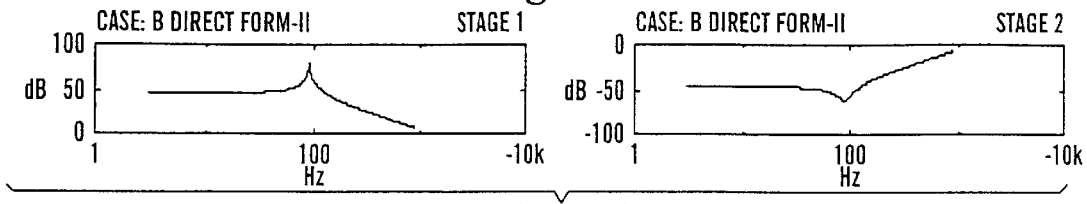
Figure 5C:
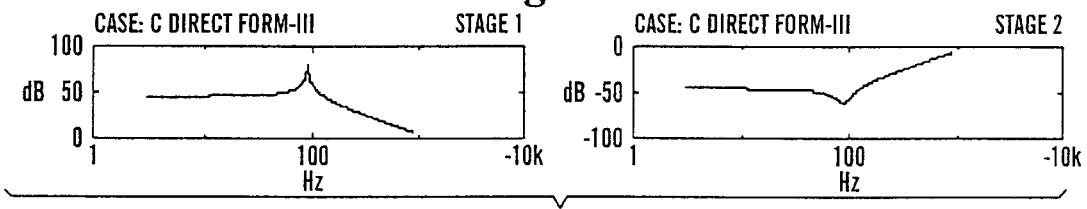
Figure 5D:
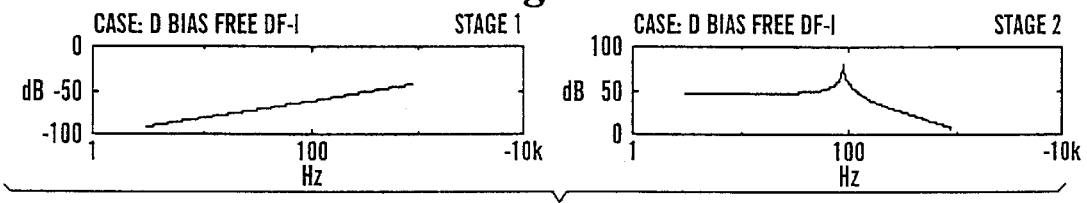
Figure 5E:
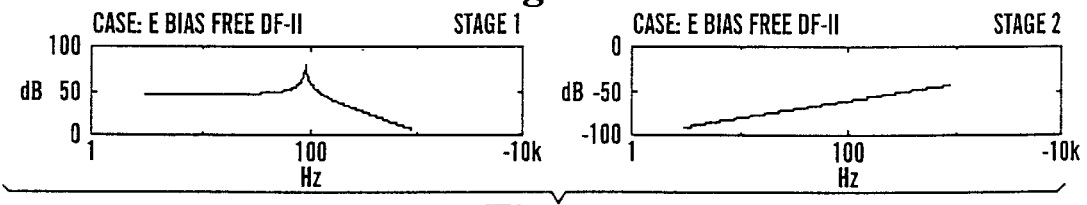
Figure 5F:
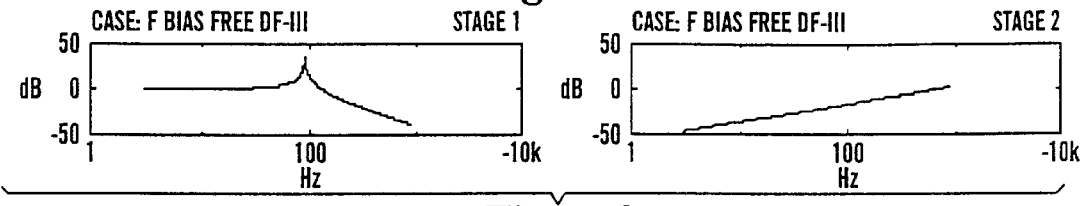
Figure 5G:
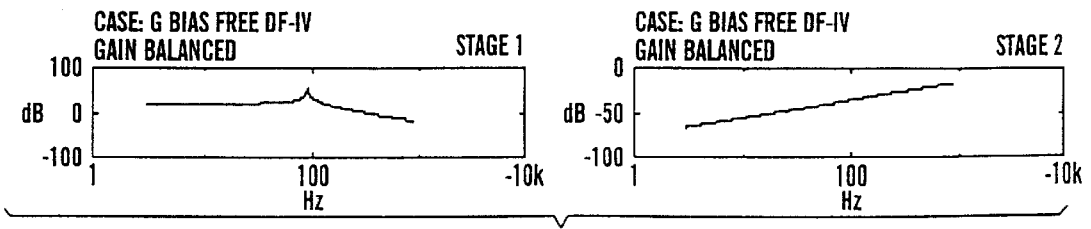

Case G: Gain Balanced Bias Free Direct Form IV (FIG. 4g)

$$M(n) = k(A-1)p(n) - EM(n-1) - FM(n-2)$$

$$V(n) = M(n) + [(B-E)/(A-1)]M(n-1) + [(C-F)/(A-1)]M(n-2)$$

$$Y(n) = p(n) + (1/k)V(n) \text{ and}$$

$$M(z)/p(z) = k(A-1)/[1 + Ez^{-1} + Fz^{-2}]$$

$$V(z)/M(z) = [1 + (B-E)/(A-1)z^{-1} + (C-F)/(A-1)z^{-2}]$$

-continued $$Y(z)/p(z) = [1 + (1/k)V(z)/p(z)]$$
$$= [1 + (1/k)\{V(z)/M(z)\}\{M(z)/p(z)\}]$$
$$= [1 + (1/k)\{1 + (B-E)/(A-1)z^{-1} + (C-F)/(A-1)z^{-2}\}$$
$$k\{(A-1)/[1 + Ez^{-1} + Fz^{-2}]\}]$$
$$= [1 + \{(A-1) + (B-E)z^{-1} + (C-F)z^{-2}\}/[1 + Ez^{-1} + Fz^{-2}]]$$
$$= [A + Bz^{-1} + Cz^{-2}]/[1 + Ez^{-1} + Fz^{-2}]$$

Here, k is a predetermined constant, preferably an integer power of 2 to simplify computation, (e.g., $\frac{1}{16} \leq k \leq 16$).

By carefully constructing the intermediate node(s) to assume the values Q(n), R(n), L(n), W(n), M(n) and V(n) as set forth in the above cases A–G, the filter gains can be designed thereby allowing the filter to operate within a suitable dynamic range. The various filter structures presented above can each be respectively characterized by the value assumed by its intermediate node(s), and the most suitable structure can then be implemented. The estimation of filter gains at various intermediate stages are now presented as a function of the filter design parameters for each structure shown in FIGS. 4a–g. Table 1 summarizes the parametric DC gains. The net DC gain of the filter is composed of two internal stages. The first stage (Stage-1) is composed of an internal state from input and the second stage (Stage-2) is composed of the output from the internal state as well as the two delayed outputs.

From Table 1 it is evident that for the direct forms of Cases A, B and C, the internal DC gains are non-zero at both Stage-1 and Stage-2. For the bias free Cases D, E, F and G, the internal gains are identically zero either at Stage-1 or Stage-2. More importantly, the internal gains are either directly or inversely proportional to the second power of the normalized frequency (f*). For example, when the peak frequency is separated from the sampling frequency by about two orders of magnitude (i.e., f0=90 Hz and fs=7920 Hz), the internal DC gain can reach above $10^3$ which is not a desirable condition for a 16-bit fixed point realization. Therefore in the direct forms of Case-B (FIG. 4b) and Case-C (FIG. 4c), the internal state is likely to exceed the 16-bit arithmetic range in an MPU or in a special chip. In Case-A (FIG. 4a), the Stage-1 gain is low but the Stage-2 gain is still high which may give rise to excessive arithmetic underflow and potential computational quantization noise in the output stage. However, if the peak frequency and sampling frequency are kept within a factor of 10 to 20, the 16-bit implementation of the first three configurations can be accommodated without concern. Therefore, the separation of f0 with respect to fs contributes significantly to the internal gain values, and the farther fs is from f0, the greater the gain values will be.

A similar situation occurs in Case-E (FIG. 4e), where the Stage-1 DC gain can reach high values but the Stage-2 gain is identically zero thereby blocking any DC signal from appearing in the parallel branch output V(n). For Case-D (FIG. 4d), even though the Stage-1 gain is low, the output gain is high. The presence of the (A–1) factor in the DC Stage-1 gain of Case-F moderates the maximum value. Therefore in situations where sampling rates are high due to product design parameters or due to requirements of the chip design, then Case-F (FIG. 4f) is a preferred structure. However, the factor (A–1) can become so low at high sampling rates that it can push the 16-bit numbers to less than a bit thus producing insensitivity at low signal levels.

To provide protection against such condition, a gain balanced structure shown in Case-G (FIG. 4g) is disclosed. Case-G requires an additional mutiplier at the output stage, but offers more freedom to optimize the filter performance at both high and low signal levels. While bias handling is important, the main purpose of the peak filter is to provide an AC gain at the peak frequency. The AC performance optimization is considered further below.

TABLE 1

Internal DC Gain of Each Filter Structure

| STRUCTURE | STAGE-1 GAIN | STAGE-2 GAIN |
|---|---|---|
| Case-A Direct Form-I | $Q/p = 4(\pi f^*)^2/D$ | $Y/Q = D/[4(\pi f^*)^2]$ |
| Case-B Direct Form-II | $R/p = D/[4(\pi f^*)^2]$ | $Y/R = 4(\pi f^*)^2/D$ |
| Case-C Direct Form-III | $R/p = A/[4(\pi f^*)^2]$ | $Y/R = 4(\pi f^*)^2/A$ |
| Case-D Bias Free Form-I | $L/p = 0$ | $V/L = D/[4(\pi f^*)^2]$ |
| Case-E Bias Free Form-II | $M/p = D/[4(\pi f^*)^2]$ | $V/M = 0$ |
| Case-F Bias Free Form-III | $M/p = (A-1)/[4(\pi f^*)^2]$ | $V/M = 0$ |
| Case-G Bias Free Form-IV | $M/p = k(A-1)/[4(\pi f^*)^2]$ | $V/M = 0$ |

In Table 2, a numerical estimate of internal AC and DC gains for Stage-1 and Stage-2 are computed for the case in which fs=7920 Hz, f0=90 Hz. The example filter exhibits a peak gain of 20 dB ($Z_a=0.08$ and $Z_b=0.0058$), and the respective filter coefficients are given as:

A=1.0052,

B=−1.9940,

C=0.9938,

D=1.0016,

E=−1.9940, and

F=0.9992.

TABLE 2

AC/DC Gains for a 20 dB Peak Filter at f0=90 Hz & fs=7920 Hz.

| STRUCTURE | STAGE-1 DC GAIN | AC GAIN | STAGE-2 DC GAIN | AC GAIN |
|---|---|---|---|---|
| Case-A Direct Form-I | Q/p = 0.005 | = 0.0008 | Y/Q = 1964.89 | = 12240 |
| Case-B Direct Form-II | R/p = 1964.89 | = 12240 | Y/R = 0.005 | = 0.0008 |
| Case-C Direct Form-III | R/p = 1975.28 | = 12305 | Y/R = 0.005 | = 0.0008 |
| Case-D Bias Free Form-I | L/p = 0.0 | = 0.0007 | V/L = 1964.89 | = 12240 |
| Case-E Bias Free Form-II | M/p = 1964.89 | = 12240 | V/M = 0.0 | = 0.0007 |

TABLE 2-continued

AC/DC Gains for a 20 dB Peak Filter at f0=90 Hz & fs=7920 Hz.

| STRUCTURE | STAGE-1 DC GAIN | AC GAIN | STAGE-2 DC GAIN | AC GAIN |
|---|---|---|---|---|
| Case-F Bias Free Form-III | M/p = 1.039 | = 64.740 | V/M = 0.0 | = 0.141 |
| Case-G Bias Free Form-IV | M/p = 10.39 | = 647.40 | V/M = 0.0 | = 0.0141 |

The filter transfer functions are summarized, respectively, in the spectral plots of FIGS. 5a–g. (All filter structures have the same overall spectral characteristic, i.e., an output at the peak frequency of interest f0; however, FIGS. 5a–g show the spectra of the internal stages thereof.) It can be concluded by comparing the numerical values of Table 2 as well as the graphical results of FIGS. 5a–g, that the filter structure of Case-G (FIG. 4g) provides the best balance between AC/DC gains of input Stage-1 and output Stage-2, while ensuring sensitivity to low signal levels with 16-bit arithmetic.

It can also be observed that in the bias free structures of Case-D (FIG. 4d), Case-E (FIG. 4e), Case-F (FIG. 4f) and Case-G (FIG. 4g) the coefficient (B−E)=0.0, and therefore a multiplication block is not required. Nevertheless, for a general second order filter case in which undamped natural frequencies fa and fb are not equal, the term B is not zero, and it is therefore desirable to reserve a multiplier corresponding to the B term. The the coefficient (C−F)/(A−1) is identically equal to [−1] in the case when fa=fb.

Step: 3 Considerations in Locating the Peak Filter in the Servo Loop

Figure 6A:
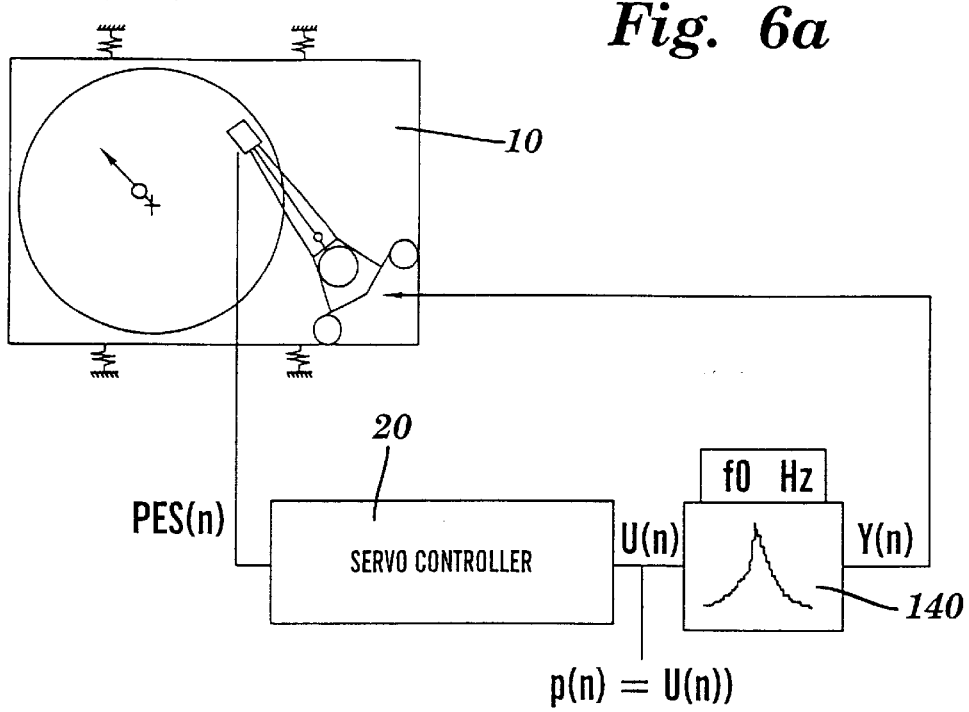
FIG. 6a depicts a series, cascade configuration for a vibration filter in the servo loop.
Figure 6B:
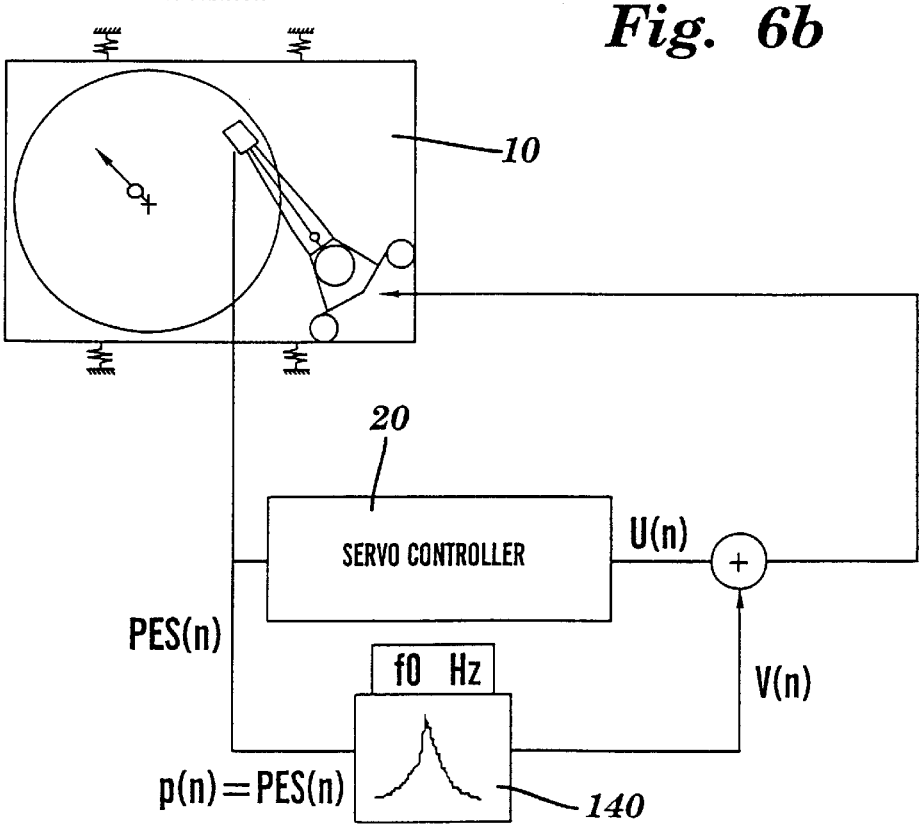
FIG. 6b depicts a parallel configuration for a vibration filter in the servo loop.

The selected peak filter can be inserted at various points in the track-follow servo loop. There are at least two possible location options. The first option is a cascade (series) location in which the track-follow controller 20 output is fed to the peak filter 140 input (FIG. 6a). In this case, all seven cases of filter structures disclosed above can be considered as candidates even though Case-F or Case-G is recommended because of their internal range handling capabilities. The second location option is a parallel location in which the track-follow controller 20 output and the peak filter 140 output are computed from identical PES inputs and then summed (FIG. 6b). For this configuration, the peak filter should have near zero gain at all frequencies except at the desired peak frequency. The parallel portion of the bias free cases Case-D, -E, -F and -G are suitable for this parallel configuration. Even though the cascade configuration and the parallel configuration will not have identical open loop peak gains at the cross vibration frequency, the filter peak gain will dominate at the cross vibration frequency, and at all other frequencies it will behave as a zero gain path. To minimize servo computational delay (due to the presence of multiplier/adder units), the parallel configuration, with common PES input of FIG. 6b is preferred.

Multiple peak filters can be configured in parallel, with a single unity gain in parallel to all filters, and the entire filter set can be positioned in cascade (series) with the track-follow controller, similar to the approach of FIG. 2a.

Step 4: Peak Frequency Detection

Preferably, the product should be programmed such that the cross vibration filter's required coefficients A, B, C, E, and F (discussed above), can be computed without any human intervention. As discussed above with reference to FIG. 3, coefficients A, B, C, E and F are determined as a function of f0, the frequency of interest. However, the frequency of interest must be determined. In accordance with the present invention, and as set forth in the flow diagram of FIG. 7a, the present invention involves the determination of the frequency of vibration using an automatic detection technique. FIG. 7b depicts the arrangement of a scanning filter 240 placed outside of the servo loop in an open loop configuration to determine the frequency of cross vibration.

During the calibration period, the self vibration filter can be placed in the loop to eliminate any self vibration component appearing in the PES stream. A digital peak filter 240 (the eventual cross vibration filter, or any other available filter), is configured in an open loop with the PES as its input as shown in FIG. 7b (step 1010). The peak filter's coefficients are computed for a selected minimum frequency value ($f_{min}$ of f0 (step 1020), and the peak filter's output is analyzed for its maximum (a(f0)). Once the maximum output of the peak filter has been determined by the MPU, this value, and the selected f0 is stored for subsequent use. The peak frequency value is then incremented by an amount "df," and the process of setting new peak filter coefficients, extracting the maximum filter output value, and retaining the pair of values is repeated N times (steps 1030, 1040 and 1050) until the maximum value ($f_{max}=f_{min}+(N-1)*df$) for f0 is reached. Typical values for a single frequency scan are $f_{min}$=50 Hz, df=1 Hz and $f_{max}$=180 Hz. After engaging the digital filter in the open loop mode, a minimum wait period is allowed for the filter output to reach a steady sinusoid-like amplitude before estimating the amplitude, a(f0). The coefficients may be pre-computed (and stored) for each frequency step, or, in the alternative, be calculated real-time, for example, using the coefficients as discussed above.

After the frequency range $f_{min}$-to-$f_{max}$ has been scanned, there should be N pairs of frequencies and corresponding amplitudes (f0 and a(f0)) retained in memory as depicted in the exemplary graph of amplitude vs. frequency of FIG. 7c. The frequency point at which a(f0) reached a global peak value can now be ascertained. If the a(f0) value exceeds a preset threshold value (e.g., 1110), a peak filter corresponding to the particular frequency parameter f0 can be configured in the servo loop by calculating the coefficients A, B, C, E and F as a function of f0 (step 1060), as discussed above.

Figure 8:
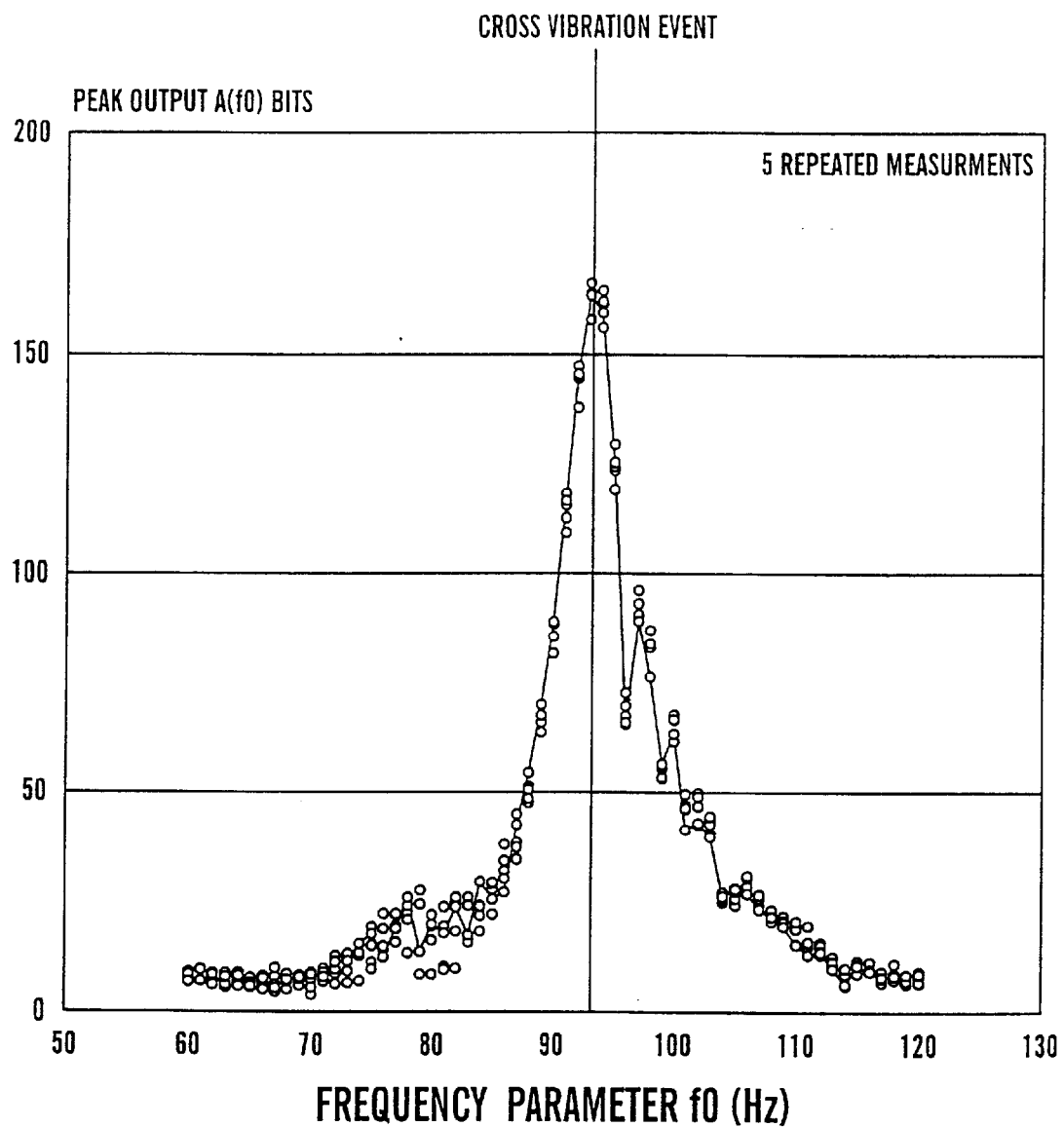
FIG. 8 depicts five repeated measurements for a sample detection process carried out in accordance with the present invention.

FIG. 8 shows an experimentally measured plot of a(f0) vs. f0. The measurements were repeated 5 times to check the consistency of convergence to a clearly defined peak value. As explained below, 2 revolutions of the spindle were used to allow the filter to settle, and 2 revolutions of filter state samples were collected to obtain the data set per frequency point. The scan rate in this test was about 1 Hz per 4 revolutions. The peak frequency parameter reaches a value of 93 Hz. The actual cross vibration frequency in the test was 90 Hz, and the frequency shift of 3 Hz can be attributed to the rate of scanning (2 Hz) and warping (1 Hz). Adjusting for the scan-rate dependence of the filter peak a(f0), the very peak filter that produces the maximum a(f0) value in the open loop configuration will also reject the cross vibration error component when placed in the feedback configuration. Therefore the warp induced frequency shift is not required to be known for this purpose of this application.

Figure 9A:
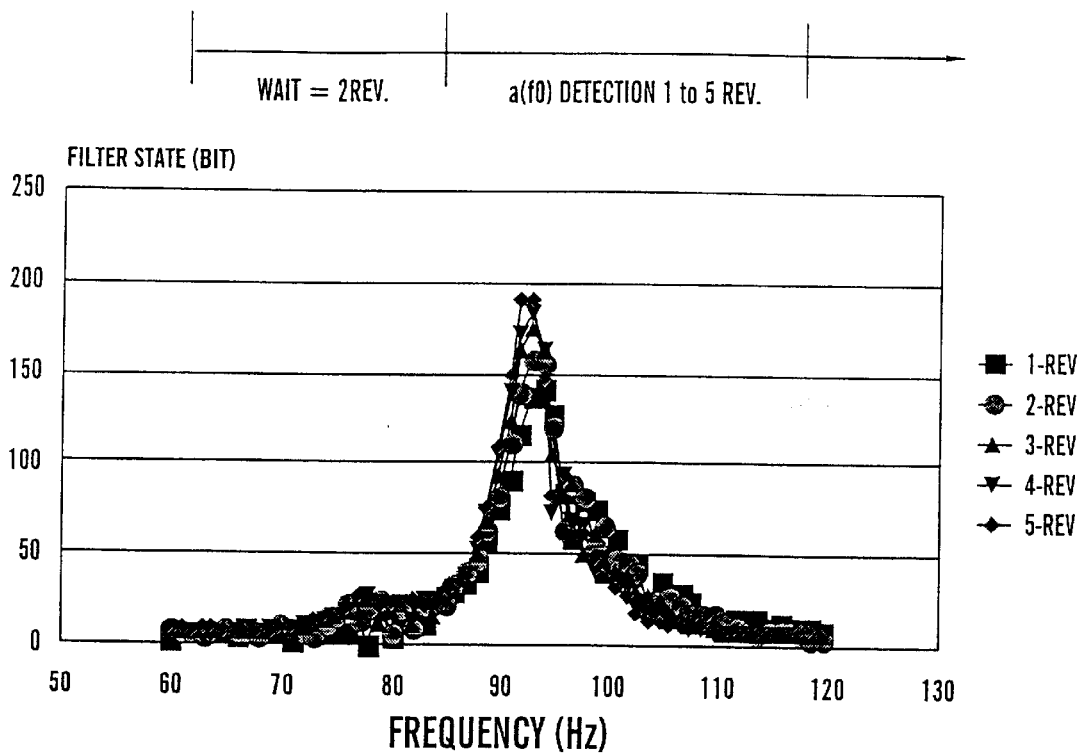
FIGS. 9a–b are 5, coincident spectral plots of frequency detections in accordance with the present invention wherein the amplitude measurement was delayed by 1–5 revolutions, respectively.
Figure 9B:
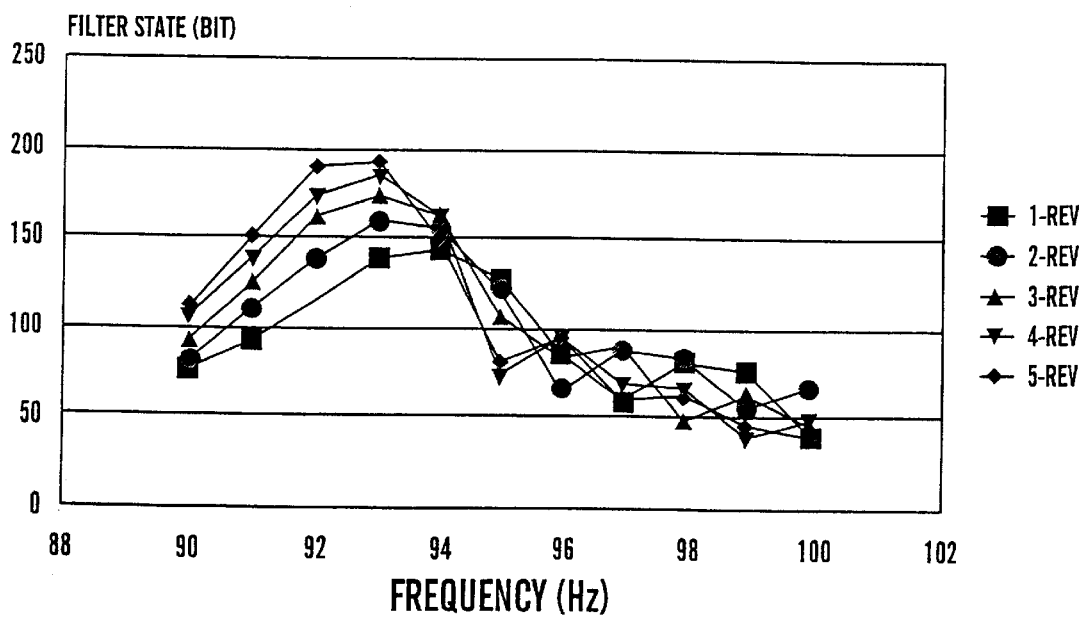

There is a time penalty involved in the frequency detection phase. It is important to minimize the detection time by scanning through the frequency range quickly. Experiments conducted show that after each filter update, about 2 revolutions of the spindle should be allowed for the peak filter to reach its steady value. After a 2 revolution delay, the estimate of the peak amplitude filter state can be recorded anywhere from 1 revolution worth of samples to any arbitrary number of revolutions. A test was performed to determine the sensitivity of this frequency scanning technique to the number of revolutions. The same measurement was made for 1 through 5 revolutions. The resultant plots of FIGS. 9a–b show that fewer revolutions lead to a higher frequency estimate. At 5 revolutions worth of samples, the peak frequency parameter reached a value of 92 Hz. If 20 revolutions were allowed, the estimated frequency was 91 Hz. Therefore the true frequency warp in this case is about 1 Hz (~1% off) and the frequency shift due to shorter sample length is about 1 Hz for the 5 revolution case and 2 Hz for the 2 revolution case. It can be concluded that with about 2% error, using a 2 revolution delay and 2 revolutions for the amplitude estimate, the detection process can be reasonably carried out for each f0. For an HDD having a spindle rotation of 90 rps, a 100 Hz scanning at 1 Hz steps with 4 revolutions per sample, the detection process will take only 4.5 (400/90) seconds. To improve the estimate of the peak frequency parameter, a second detection operation can be performed and compared with the previous detection. If the results correspond, then the accuracy of the first pass is confirmed. Such a situation may be useful in the presence of operating shock.

The detection process can be further refined to minimize the required time. For example, a coarse scanning at larger frequency step, e.g., df=5 Hz, can be conducted to approximate the peak. Then a finer resolution, slower scan can be conducted to detect the peak with smaller frequency steps, and therefore higher accuracy. Memory space requirements can also be reduced by storing the a(f0) values in consecutive locations without explicitly storing the corresponding f0 values during the scanning process.

The decision to use a single peak filter or multiple peak filters can be based on the a(f0) distribution. If several a(f0)s are found to exceed the threshold value, then multiple filters can be configured. In situations where a server has several HDDs in the same computer frame the likelihood of more than one substantial cross vibration peak frequency is high. The number of filters that can be set to run in either parallel or cascade mode is governed by the amount of phase margin required for the HDD to operate robustly. Typically a phase margin of 25–30 degrees is preferred.

Figure 10A:
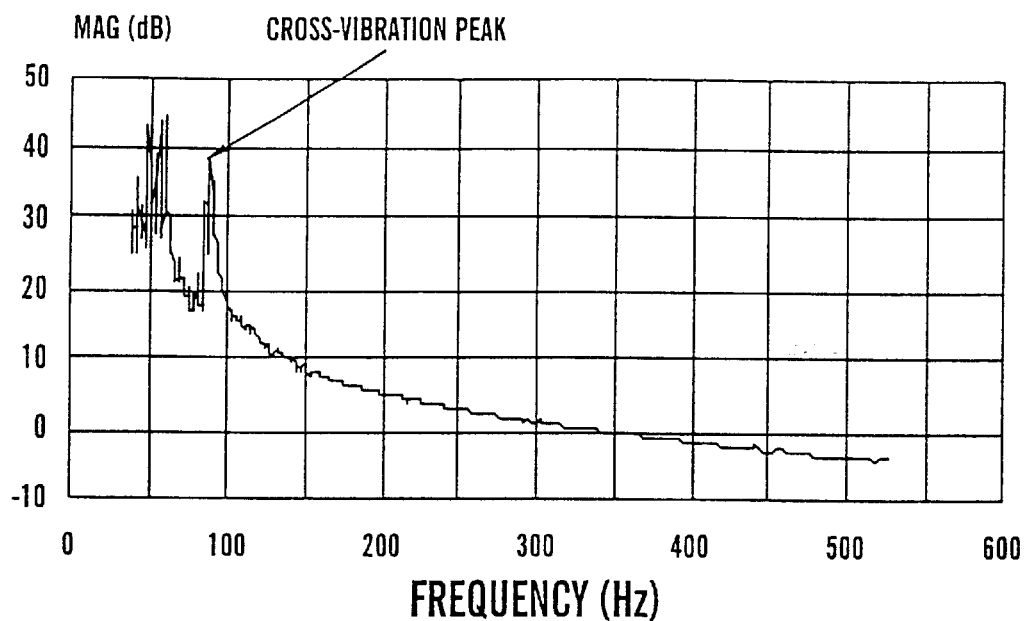
FIGS. 10a–b are amplitude and phase spectral plots for a vibration filter implemented in accordance with the present invention.
Figure 10B:
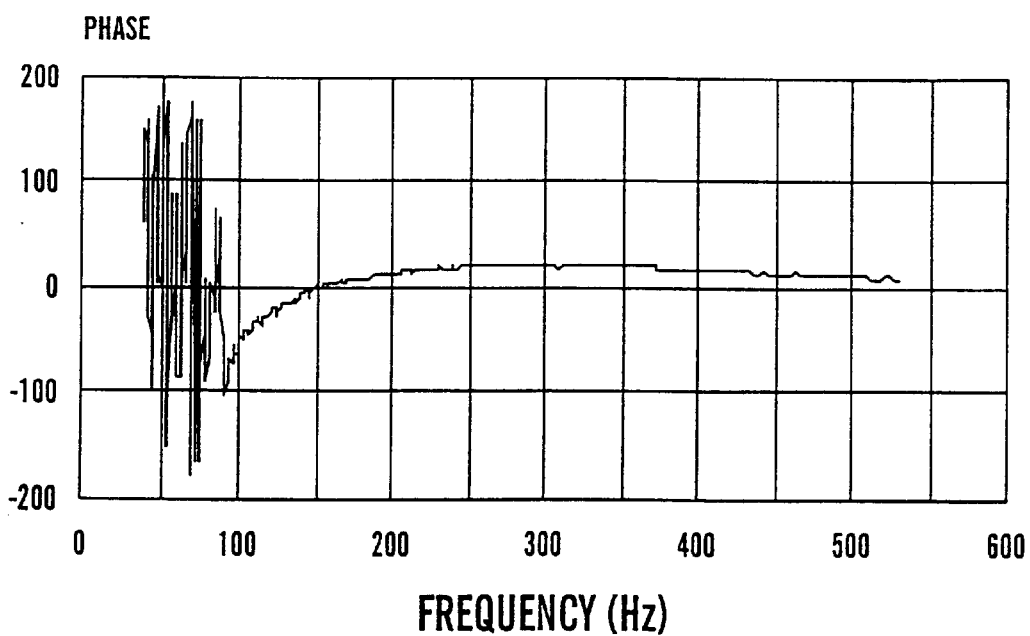
Figure 11A:
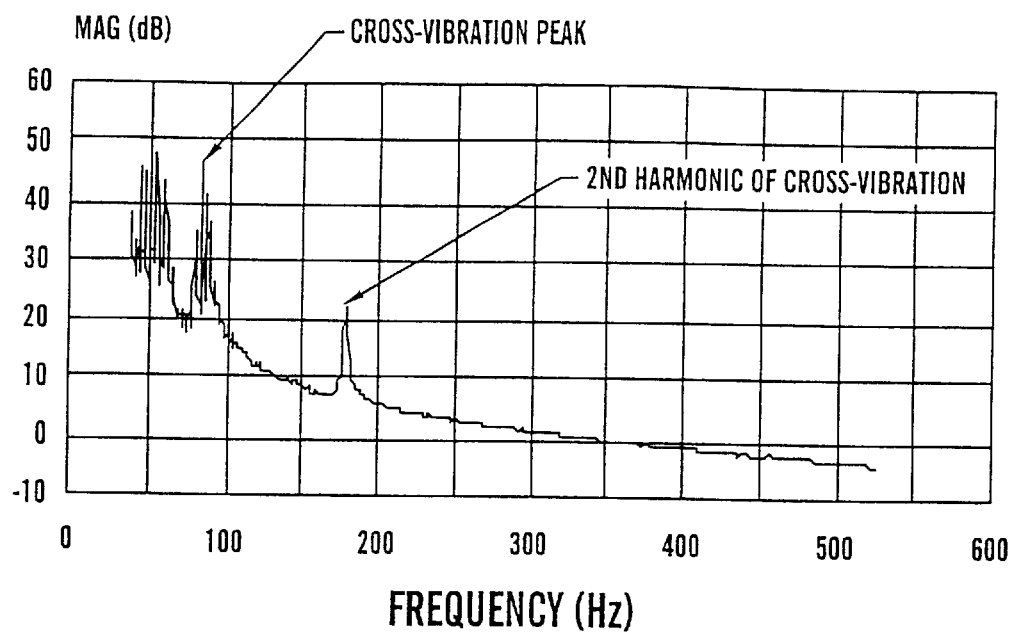
FIGS. 11a–b are amplitude and phase spectral plots for a vibration filter, and a second vibration filter implemented at the second harmonic of the vibration, in accordance with the present invention.
Figure 11B:
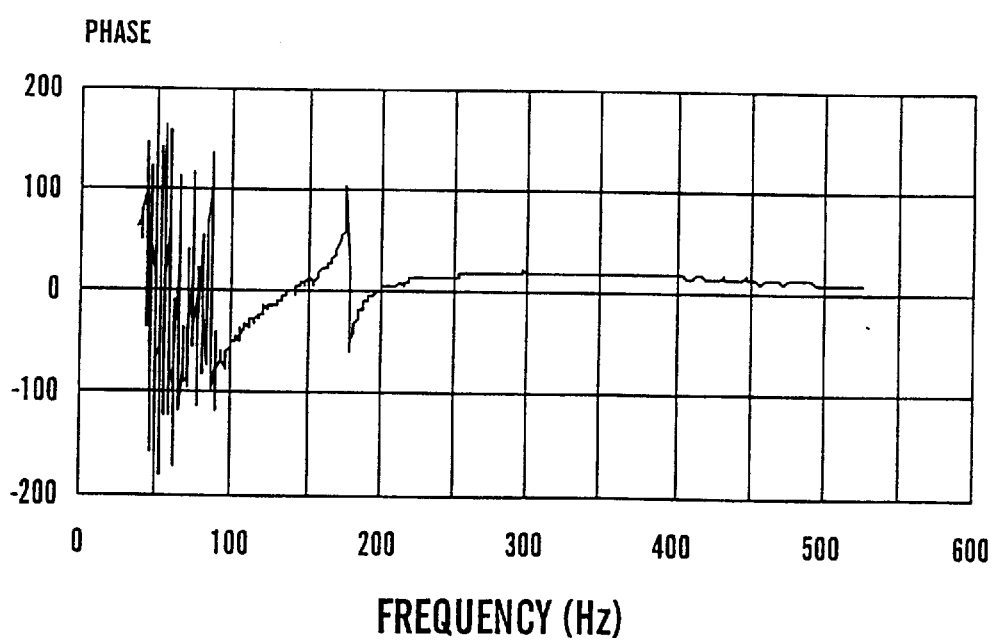

In the experimental studies it was found that excessive HDD imbalance not only produced a 90 Hz component but also excited a second harmonic vibration at 180 Hz. The amplitude and phase spectral plots of FIGS. 10a–b depict an example of a measured open loop transfer function with a cross vibration filter set at f0=90 Hz. A self vibration peak filter at f0=75 Hz is also configured, but the measurement noise due to pivot hysteresis prevents any visible peak at 75 Hz. In FIGS. 11a–b an open loop transfer function including a third filter set at f0=180 Hz demonstrates the possibility of including multiple filters to suppress higher harmonic components present in the vibrations.

Figure 12:
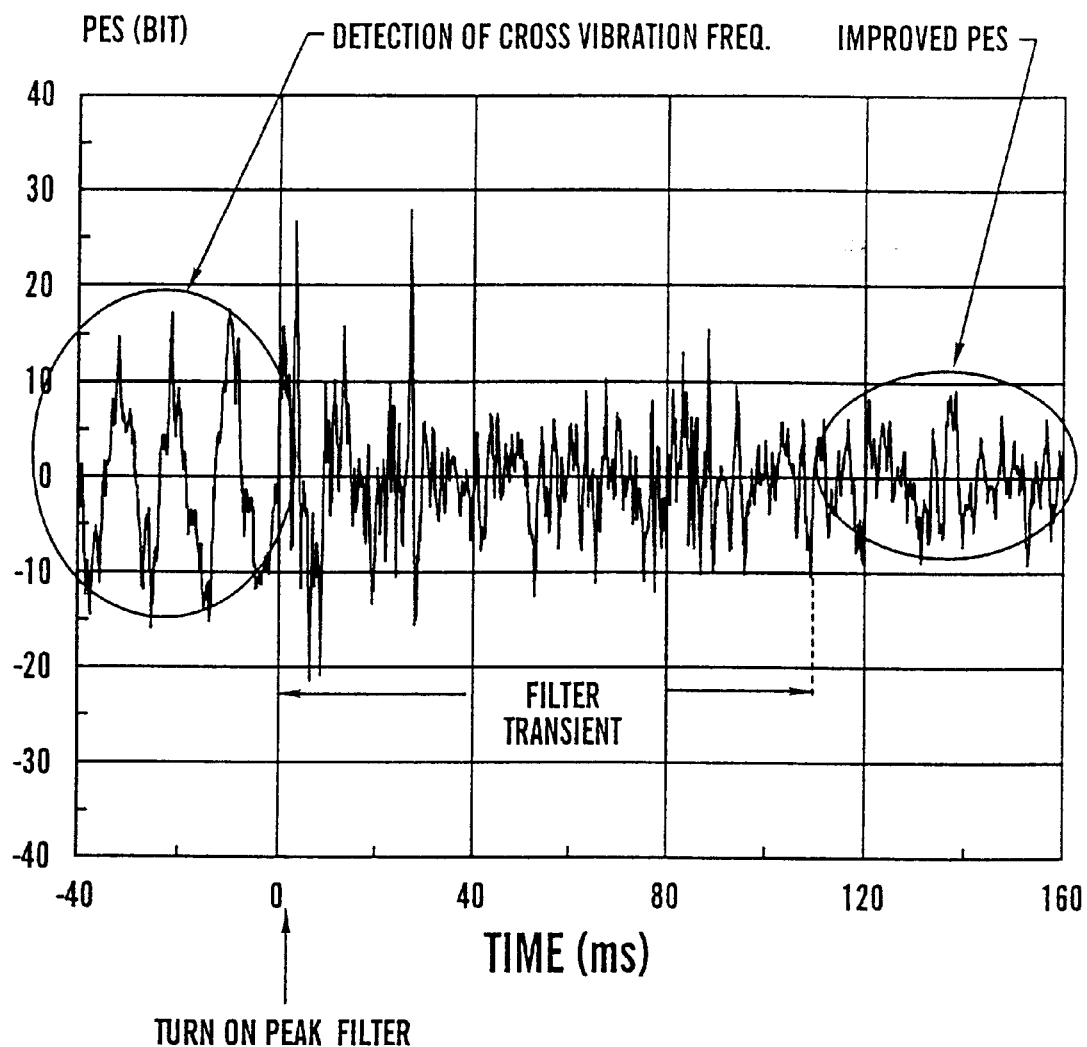
FIG. 12 is a time plot of a PES during both the detection and correction phases, in accordance with the present invention.

In one experiment, the frequency detection process described in this previous section was employed to detect the dominant cross vibration frequency, and then a servo control system including a cascade peak filter configuration was implemented. FIG. 12 is a PES time trace obtained during the detection phase and servo control phase for this experiment.

Prior to the filter operation (during the detection phase), a strong periodic signal is present. Once the frequency detected properly and a peak filter engaged, this periodic cross vibration was compensated properly and its presence could not be observed in the PES trace.

Hence in steady track-follow mode it is possible to detect and compensate for single or multiple frequency vibration sources. The next challenge involves performing seek operations using this configuration without any settleout time penalty.

Step 5: Filter Initial Condition Update and Addressing

In U.S. Pat. No. 5,608,586, a method of storing the filter state to initialize the filter for minimum settleout transient dynamics was presented. This patent addresses the problem related to physical shifting of a disk from its center of rotation. This component is known to be stable during a power ON cycle, and the peak filter state has to be configured and stored only once. Once configured, the addressing of the filter state is locked to the servo sector number of the disk itself.

However, in the case of cross vibrations from another disk (e.g., 10') the amplitude and phase of the vibration components are subject to variation during the entire operation of the drive, and the filter state should be periodically updated to preserve optimal seek and settle characteristics. Also, the filter's addressing scheme should take into consideration the fact that the frequency of rotation of the first drive (10) and the frequency of the cross vibrations from the other drive (10') are not coupled, since each spindle is controlled by independent electronics. Further, since the filter may not be activated during seek, but only during settle-out/track follow, the appropriate filter state must be addressable when the filter is reactivated during settle-out.

Figure 13:
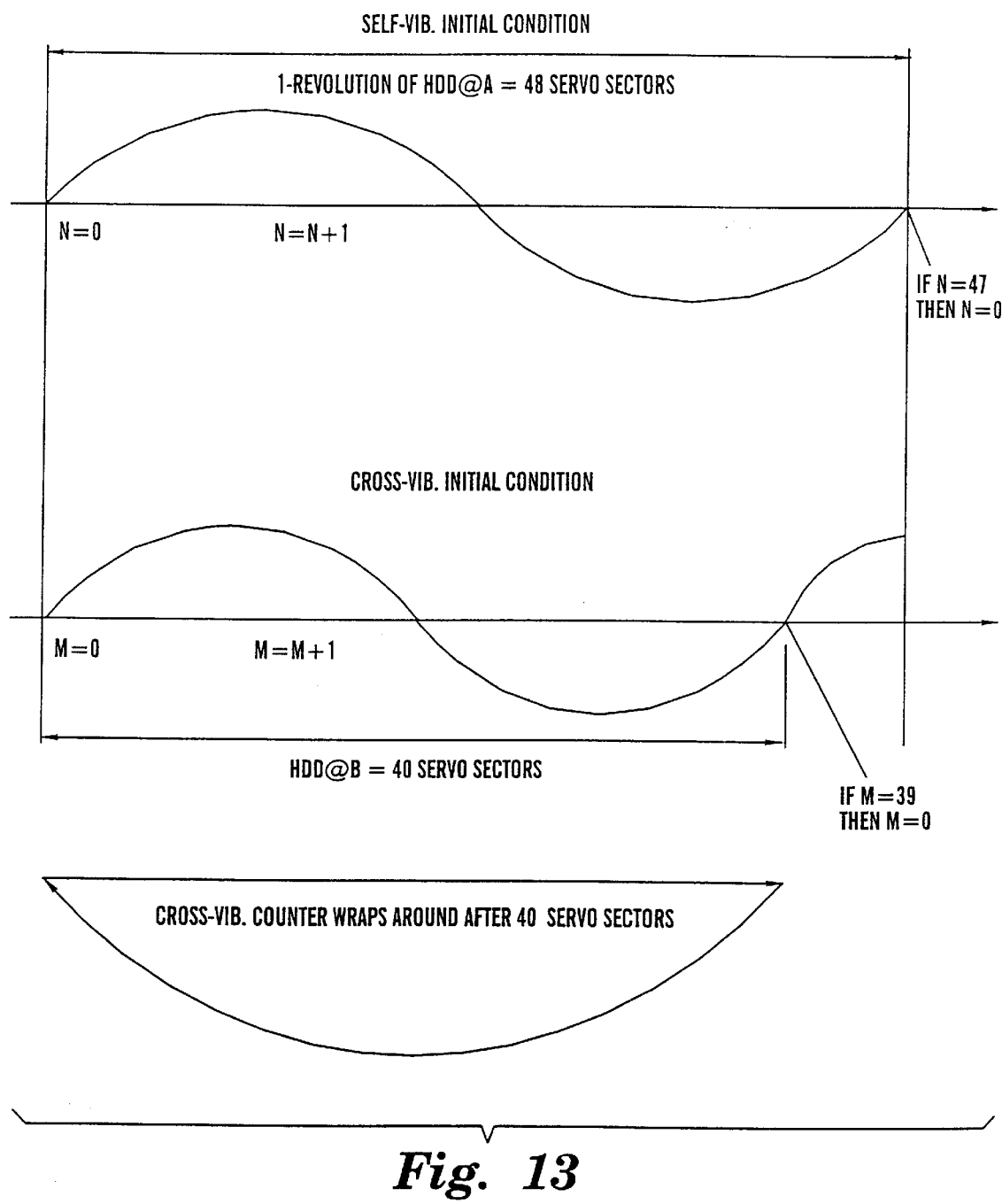
FIG. 13 illustrates an addressing scheme used to address the initial conditions of the digital peak filter implemented in accordance with the present invention.

FIG. 13 depicts an example of a filter state addressing scheme in accordance with the present invention. Two counters M, N, are employed, which are used to access corresponding values in the cross, and self vibration filter state vectors, respectively, as the filter(s) are repeatedly engaged for each settle-out/track follow activation. Drive 10 has $N_{max}$=48 sectors, and the detected cross vibration has a period corresponding to $M_{max}$=40 sectors (of drive 10). (In this example, $M_{max}$=$N_{max}$(75 Hz/f0)). To be able to correctly access the cross vibration filter's state vector when the filter is activated, the counter M wraps around when M=$M_{max-1}$ (here, 39). The counter M is updated in drive 10's microcode continuously every time a servo sector is encountered. The counter value M at any given instant is associated with an address pointer to corresponding value(s) in the stored filter state, which are used for initial conditions every time the filter(s) are activated. Though two filters are shown, this principle applies to any single operational filter also.

Figure 14A:
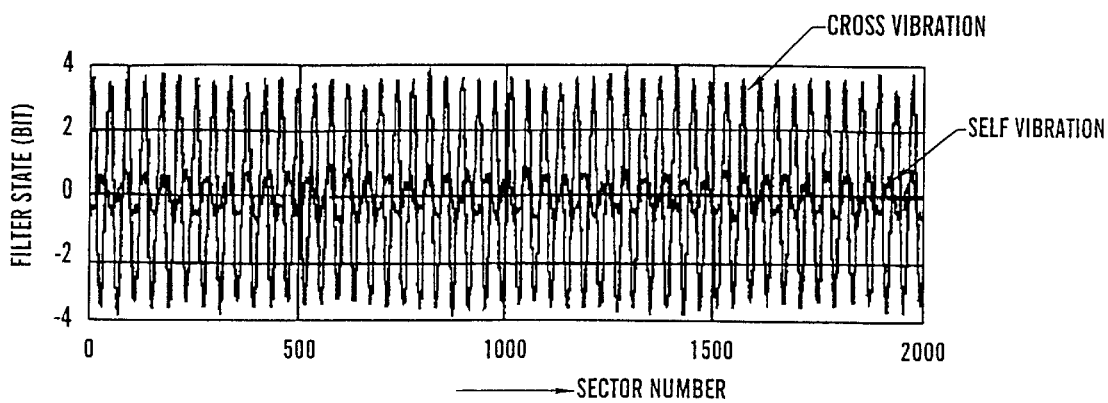
FIGS. 14a–c depict measured self and cross vibration filter states used to determine an optimum refresh rate for the initial conditions of the cross vibration filter, according to the present invention.
Figure 14B:
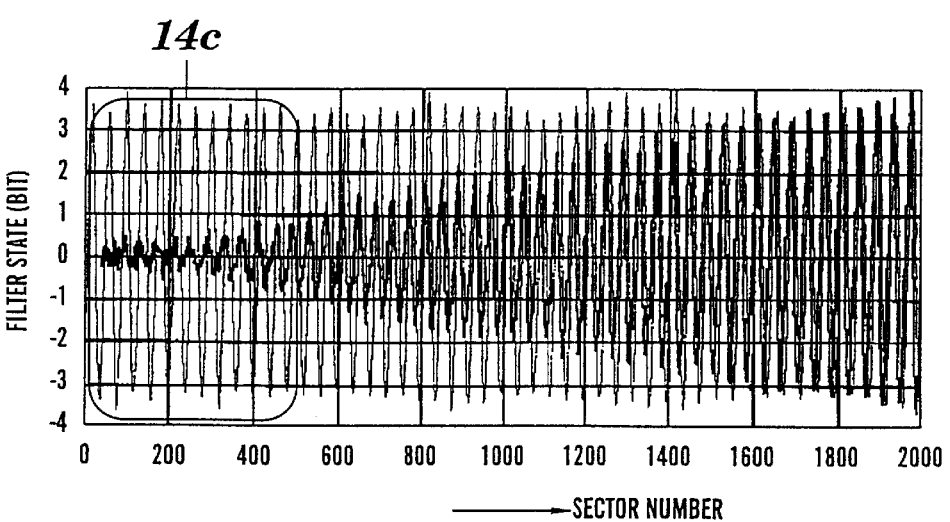
Figure 14C:
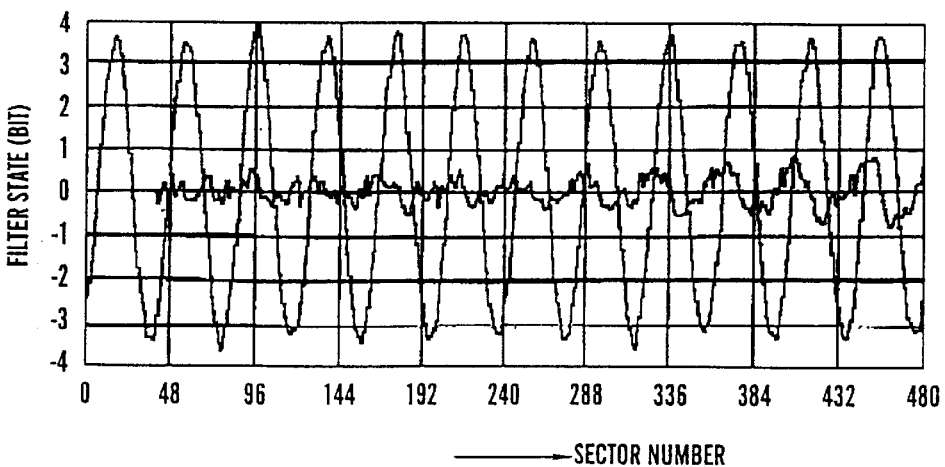

Since the cross vibration due to drive 10' may drift in phase and magnitude, it is important to refresh the stored filter state (i.e., initial condition vector) routinely. FIGS. 14a–c are time plots of the actual filter states of self and cross vibration filters, the error between the cross vibration filter and a predicted state assuming a fixed periodicity for about 40 revolutions, and the same plot (expanded along the time axis) for about 10 revolutions, respectively. It can be observed from FIG. 14c that the error is less than 20% of the peak amplitude for about 10 revolutions of the drive 10. The filter state can therefore be refreshed immediately, but, to save processing, can be refreshed about every 5 to 10 revolutions of the drive 10. Beyond that limit, using "stale" initial conditions can be more damaging to the optimal settle-out characteristics of the actuator system than using nulls as the initial conditions.

Figure 15A:
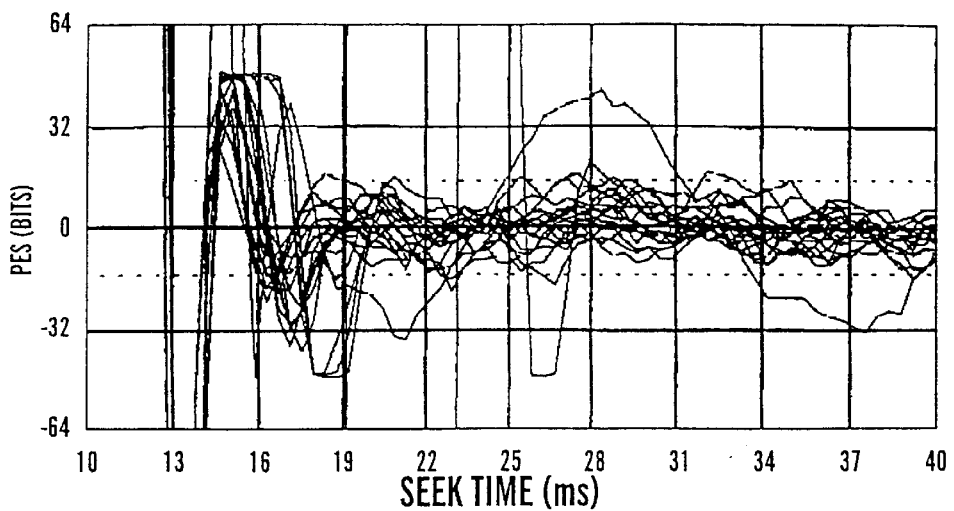
FIGS. 15a–c are time plots of the PES associated with a zero filter initial state, an optimally initialized filter state, and an optimally initialized, running averaged filter state, respectively.
Figure 15B:
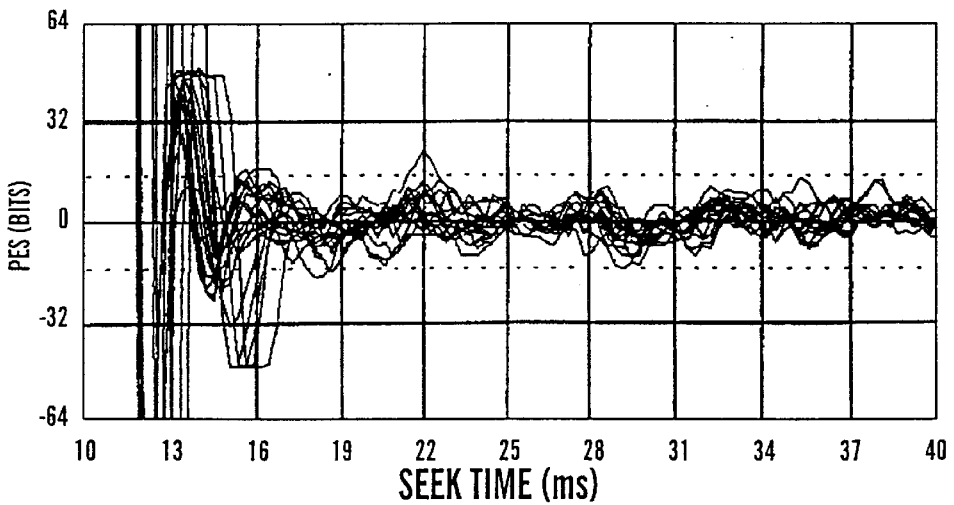
Figure 15C:
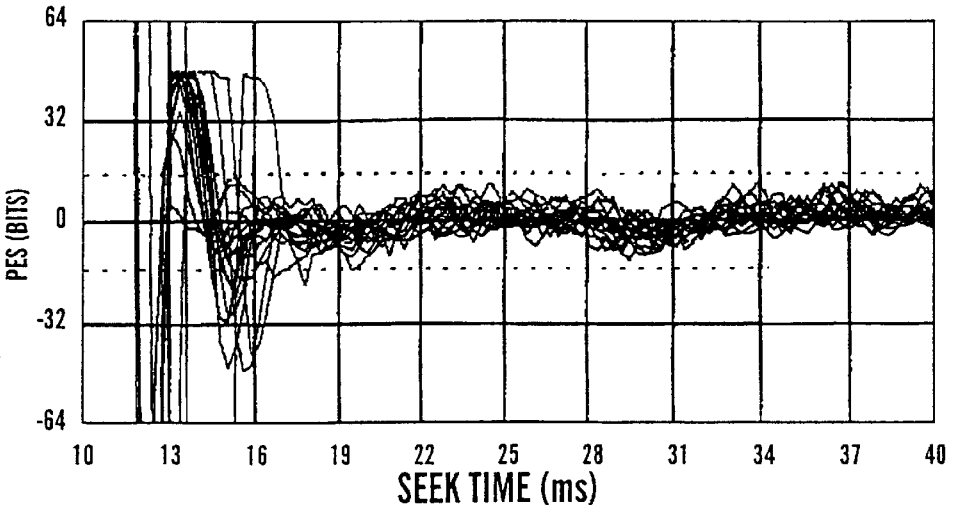

FIGS. 15a–c are time plots of the PES for three, respective cases of multiple seeks. In all cases a cross vibration filter is engaged as the track-follow mode is entered. In FIG. 15a, the filter is engaged with quieting (e.g., null) initial conditions. The arrival trajectories are somewhat dispersed. In FIG. 15b, the initial condition update was used as described in the previous sections, i.e., using the output filter state to update the initial condition vector, preferably every revolution, but at least every 5 to 10 revolutions. The trajectories are much more closely packed, indicating robust arrival characteristics. In FIG. 15c, the filter states are averaged over two cycles, showing further improvement in the PES trajectory.

The stored initial condition values ideally represent the detected cross vibration against which the peak filter is operating. During the frequency detection, the disk may also be subject to other forms of disturbance, and the resultant initial condition values may not truly represent the cross vibration condition. It is therefore important to protect the filter from excessive transients resulting from improper initialization due to such spurious effects. Since the steady maximum amplitude and rate of amplitude change of the filter states are short term stable (i.e., within 10 revolutions), an upper limit on the filter state and filter rate of change can be imposed. This operation is referred to as smart clipping. Use of smart clipping to limit the filter's internal state to an upper bound offers an improvement to settle time, over a zero initial condition approach. The designer has the choice of keeping the initialization process simple and incurring a settleout penalty, or maintaining an elaborate initialization process and achieving the optimal settleout property.

Continuous Snooping and Adaptation Mode:

In Step: 4 above, the process of cross vibration frequency detection was discussed in detail. The issue of peak frequency shift during the operation of an HDD also needs to be considered in the case of peripherals such as constant linear velocity CD-ROMs. Under such conditions, the servo microcode should run continuous sweeps to track the peak frequency component(s) by probing the PES while the established peak filters are already in the feedback loop. This is a form of noninvasive "snooping" of the operational servo system for any change in its characteristics. When a substantial amplitude peak in the PES is detected, then a decision can made on-line to either shift the established filter's peak frequency, or to introduce an additional peak filter as appropriate.

Periodic vibrations can include both self and cross vibration components, and it is critical to address both problems to achieve high track densities. The above discussion was directed to an exemplary, cross vibration problem, however, the present invention is broadly directed to any type of vibration, such as self vibration, and all of the techniques discussed above are equally applicable thereto.

Figure 16A:
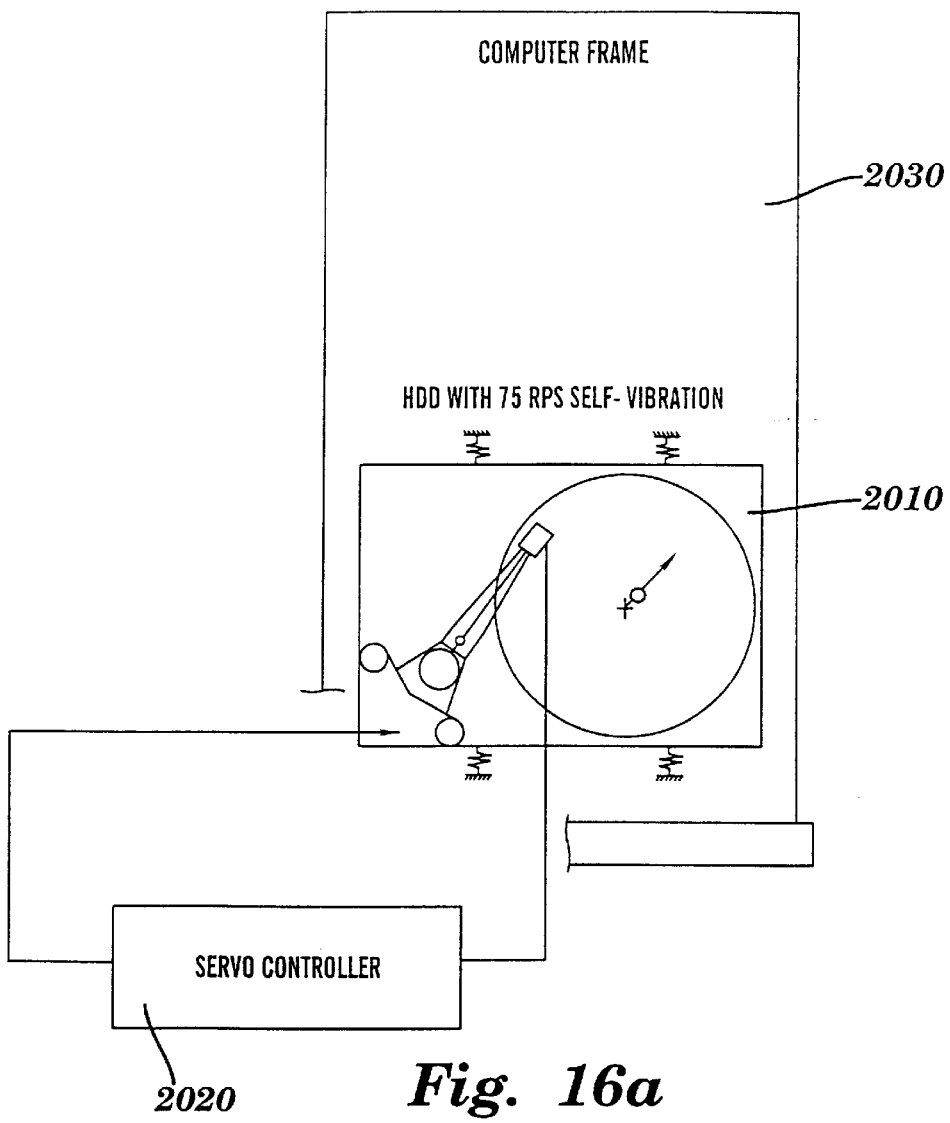
FIG. 16a a computer frame with a single disk drive therein subject to self vibration frequency components.
Figure 16B:
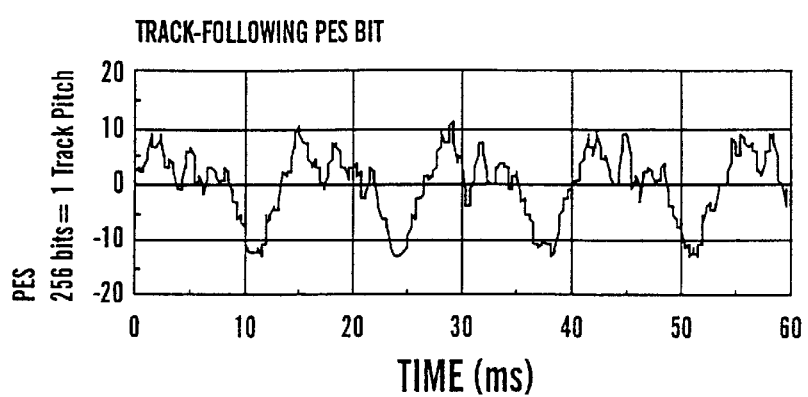
Figure 17A:
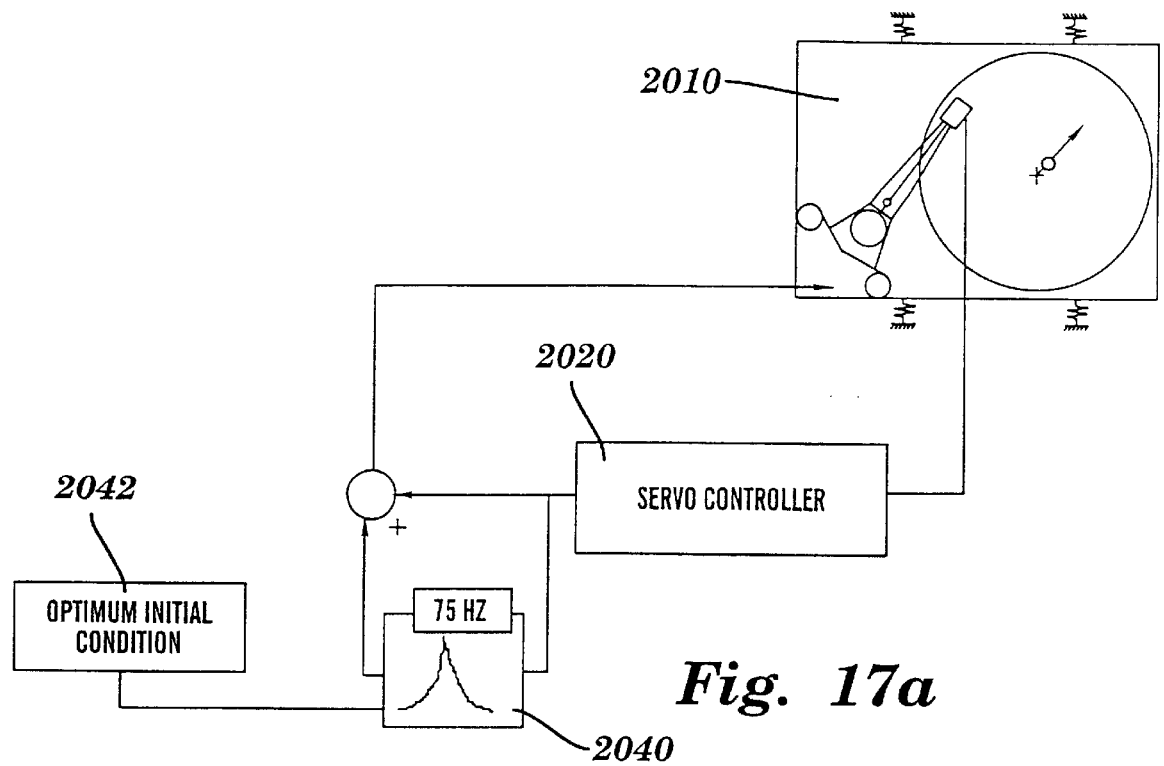
FIG. 17a depicts the placement of a peak filter at the self vibration frequency of interest having an optimal initial condition applied thereto.

FIG. 16b is an amplitude vs. time graph of the position error signal ("PES") of the HDD 2010 of FIG. 16a subject to a self-vibration component when it is mounted in a computer frame 2030, and controlled by servo controller 2020. The HDD's spindle speed is about 75 revolutions per second ("rps"). Therefore, as shown in FIG. 17a, the system can be modified by adding a peak filter 2040, centered about 75 Hz, to reduce this component in the servo loop, using initial conditions 2042.

Figure 17B:
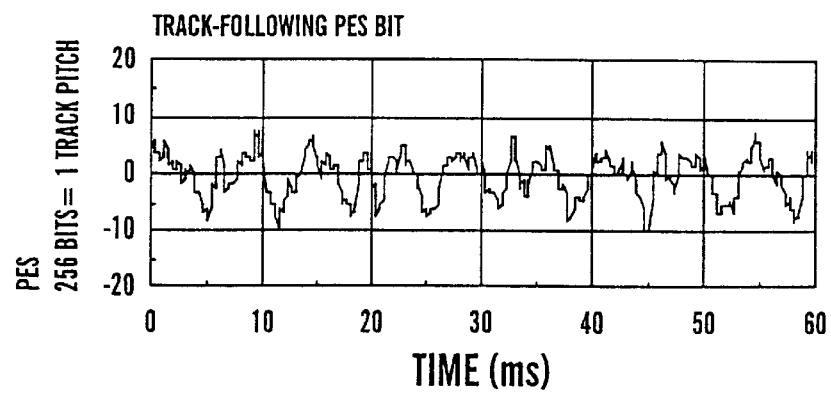
FIG. 17b is a time plot of an improved PES in accordance with a self vibration cancellation technique in accordance with the present invention.

The amplitude and phase parameters of the run out corresponding to a shock induced disk-shift generally remain fixed during a power ON cycle of a mobile HDD product, and the filter initial conditions 2042 can be obtained from a table lookup as disclosed in U.S. Pat. No. 5,608,586. The servo sector number is associated with the address of the initial condition in the table list. The filter state is measured and stored at the begining of a power ON cycle. However, the self-vibration components can be affected by time dependent environmental effects such as temperature. Thus the amplitude and phase of the filter state drift during operation of the HDD. Experiments show that the self-vibration components remain relatively fixed on a time scale of minutes. An additional enhancement to the technique of U.S. Pat. No. 5,608,586 is possible, i.e., the filter state that is stored in the MPU memory to initialize the peak filter can be updated several times within a power ON cycle of the HDD in accordance with the update techniques discussed in Step 5 above. FIG. 17b shows an improved PES after having implemented the techniques of U.S. Pat. No. 5,608,586 with the above-mentioned enhancement to the update of initial condition.

The techniques described herein can be implemented in program code, and therefore may be included in an article of manufacture (e.g., one or more computer program products) having, for instance, computer useable media. The media has embodied therein, for example, computer readable program code means for facilitating the techniques of the present invention in a processor in the data storage device. The article of manufacture can be included as part of the data storage device or sold separately.

While the invention has been particularly shown and described with reference to preferred embodiment(s) thereof, it will be understood by those skilled in the art that various changes in form and details may be made therein without departing from the spirit and scope of the invention.

What is claimed is:

1. In a data storage device having a medium mounted for movement relative to an access element, and a servo system for controlling a position of the access element with respect to the medium, a method for reducing the effect of a vibration on a position signal in the servo system, comprising:

detecting, during operation of the data storage device, a frequency of the vibration of the medium.

2. The method of claim 1, wherein said detecting includes:

configuring a detection filter to scan the position signal across a range of frequencies, and, at each respective scanned frequency, recording an amplitude associated therewith; and determining whether any of the recorded amplitudes exceeds a predetermined threshold, thereby locating the corresponding frequency of the vibration.

3. The method of claim 2, wherein said configuring a detection filter includes, for each respective scanned frequency, using a plurality of filter coefficients determined primarily as a function of each respective scanned frequency.

4. The method of claim 1, further comprising:

using a corrective filter to reduce the effect of the detected frequency of the vibration on the position signal.

5. The method of claim 4, wherein said using a corrective filter comprises:

configuring the corrective filter to operate at the detected frequency of the vibration.

6. The method of claim 5, wherein said configuring the corrective filter includes determining a plurality of filter coefficients as a function of the detected frequency of the vibration.

7. The method of claim 6, wherein the corrective filter is of the form $$Y(n)=Ap(n)+Bp(n-1)+Cp(n-2)-EY(n-1)-FY(n-2), \text{ where:}$$

n denotes a sampling time index;

p(n) is said position signal at each sampling time index n;

Y(n) is the corrective filter output at each sampling time index n; and

A, B, C, E and F comprise the plurality of filter coefficients.

8. The method of claim 7, wherein said determining a plurality of filter coefficients as a function of the detected peak frequency of the vibration includes using the relationships:

$$A=[1+a1+a2]/D;$$
$$B=[-2+2a2]/D;$$
$$C=[1-a1+a2]/D;$$
$$E=[-2+2b2]/D; \text{ and}$$
$$F=[1-b1+b2]/D,$$

where:

$$a1=2\pi Z a f^*;$$
$$a2=(\pi f^*)(\pi f^*);$$
$$b1=2\pi Z b f^*;$$
$$b2=(\pi f^*)(\pi f^*);$$
$$D=[1+b1+b2];$$

Za, Zb are damping coefficients;

f* is related to the detected peak frequency of the vibration.

9. The method of claim 7, wherein an intermediate node of the filter assumes the value:

$$Q(n)=Ap(n)+Bp(n-1)+Cp(n-2); \text{ and the output } Y(n)=Q(n)-EY(n-1)-FY(n-2); \text{ and}$$

wherein A, B, C, E and F comprise the plurality of coefficients.

10. The method of claim 7, wherein an intermediate node of the filter assumes the value:

$$R(n)=p(n)-ER(n-1)-FR(n-2); \text{ and the output } Y(n)=AR(n)+BR(n-1)+CR(n-2); \text{ and}$$

wherein A, B, C, E and F comprise the plurality of coefficients.

11. The method of claim 7, wherein an intermediate node of the filter assumes the value:

$$R(n)=Ap(n)-ER(n-1)-FR(n-2); \text{ and the output } Y(n)=R(n)+(B/A)R(n-1)+(C/A)R(n-2); \text{ and}$$

wherein A, B, C, E and F comprise the plurality of coefficients.

12. The method of claim 7, wherein a first intermediate node of the filter assumes the value:

$$L(n)=(A-1)p(n)+(B-E)p(n-1)+(C-F)p(n-2);$$

a second intermediate node assumes the value:

$$W(n)=L(n)-EW(n-1)-FW(n-2); \text{ and the output } Y(n)=p(n)+W(n); \text{ and}$$

wherein A, B, C, E and F comprise the plurality of coefficients.

13. The method of claim 7, wherein a first intermediate node of the filter assumes the value:

$$M(n)=p(n)-EM(n-1)-FM(n-2);$$

a second intermediate mode assumes the value:

$$V(n)=(A-1)M(n)+(B-E)M(n-1)+(C-F)M(n-2); \text{ and the output } Y(n)=p(n)+V(n); \text{ and}$$

wherein A, B, C, E and F comprise the plurality of coefficients.

14. The method of claim 7, wherein a first intermediate node of the filter assumes the value:

$$M(n)=(A-1)p(n)-EM(n-1)-FM(n-2);$$

a second intermediate node of the filter assumes the value:

$$V(n)=M(n)+[(B-E)/(A-1)]M(n-1)+[(C-F)/(A-1)]M(n-2); \text{ and the output } Y(n)=p(n)+V(n); \text{ and}$$

wherein A, B, C, E and F comprise the plurality of coefficients.

15. The method of claim 7, wherein a first intermediate node of the filter assumes the value:

$$M(n)=k(A-1)p(n)-EM(n-1)-FM(n-2);$$

a second intermediate node assumes the value:

$$V(n)=M(n)+[(B-E)/(A-1)]M(n-1)+[(C-F)/(A-1)]M(n-2); \text{ and the output } Y(n)=p(n)+(1/k)V(n); \text{ and}$$

wherein A, B, C, E and F comprise the plurality of coefficients, and k is a predetermined constant.

16. In a data storage device having a medium mounted for movement relative to an access element, and a servo system for controlling the position of the access element with respect to the medium, a method for reducing the effect, on a position signal in the servo system, of a vibration from a source external to the data storage device, comprising:

detecting, during operation of the data storage device, a frequency of vibration of the medium; and using a first corrective filter to reduce the effect of the vibration on the position signal.

17. The method of claim 16, wherein using the first corrective filter includes:

configuring the first corrective filter to operate at a frequency of the vibration from the source external to the data storage device.

18. The method of claim 17, wherein using the first corrective filter includes:

repeatedly engaging the first corrective filter, including repeatedly accessing a filter state vector as initial filter conditions as the first corrective filter is repeatedly engaged.

19. The method of claim 18, wherein using the first corrective filter includes:
refreshing the filter state vector periodically with corresponding outputs from the first corrective filter, or with quieting values.

20. The method of claim 19, wherein the filter state vector is refreshed less than about every 5 to 10 periods of rotation of the medium of the data storage device.

21. The device of claim 18, wherein the repeatedly accessing includes using a counter to control access to corresponding values in the filter state vector as initial filter conditions as the first corrective filter is repeatedly engaged, wherein the counter wraps around at a value corresponding to a period of the vibration from the source external to the data storage device.

22. The method of claim 16, further comprising:
using a second corrective filter to reduce the effect, on the position signal, of a vibration from a source internal to the data storage device.

23. The method of claim 22, wherein using the second corrective filter includes:
configuring the second corrective filter to operate at a frequency of the vibration from the source internal to the data storage device.

24. The method of claim 23, wherein using the first and second corrective filters includes:
repeatedly engaging the first and second corrective filters, including accessing first and second filter state vectors as initial filter conditions as the filters are repeatedly engaged.

25. The method of claim 24, wherein the accessing includes:
using a first counter to control access to corresponding values in the first filter state vector as initial filter conditions as the first corrective filter is repeatedly engaged; and
using a second counter to access corresponding values in the second filter state vector as initial filter conditions as the second corrective filter is repeatedly engaged.

26. The method of claim 25, wherein the first counter wraps at a value corresponding to a period of the vibration from the source external to the data storage device, and wherein the second counter wraps at a different value corresponding to a period of the vibration from the source internal to the data storage device.

27. The method of claim 24, wherein the source of the frequency of vibration internal to the data storage device comprises rotation of the medium about a spindle thereof, and the source of the frequency of vibration external to the data storage device comprises rotation of a second medium about a spindle of a second data storage device external to the first data storage device.

28. The method of claim 17 wherein said configuring the first corrective filter includes determining a plurality of filter coefficients as a function of the frequency of the vibration.

29. The method of claim 28, wherein the first corrective filter is of the form $$Y(n)=Ap(n)+Bp(n-1)+Cp(n-2)-EY(n-1)-FY(n-2), \text{ where:}$$

n denotes a sampling time index;
p(n) is said position signal at each sampling time index n;
Y(n) is the corrective filter output at each sampling time index n; and
A, B, C, E and F comprise the plurality of filter coefficients.

30. The method of claim 29, wherein said determining a plurality of filter coefficients as a function of the detected peak frequency of the vibration includes using the relationships:

$$A=[1+a1+a2]/D;$$
$$B=[-2+2a2]/D;$$
$$C=[1-a1+a2]/D;$$
$$E=[-2+2b2]/D; \text{ and}$$
$$F=[1-b2]/D,$$

where:

$$a1=2\pi Zaf^*;$$
$$a2=(\pi f^*)(\pi f^*);$$
$$b1=2\pi Zbf^*;$$
$$b2=(\pi f^*)(\pi f^*);$$
$$D=[1+b1+b2];$$

Za, Zb are damping coefficients;
f* is related to the frequency of the vibration.

31. The method of claim 29, wherein an intermediate node of the first corrective filter assumes the value $$Q(n)=Ap(n)+Bp(n-1)+Cp(n-2); \text{and the output } Y(n)=Q(n)-EY(n-1)-FY(n-2); \text{ and}$$

wherein A, B, C, E and F comprise the plurality of coefficients.

32. The method of claim 29, wherein an intermediate node of the first corrective filter assumes the value:

$$R(n)=p(n)-ER(n-1)-FR(n-2); \text{ and the output } Y(n)=AR(n)+BR(n-1)+CR(n-2); \text{ and}$$

wherein A, B, C, E and F comprise the plurality of coefficients.

33. The method of claim 29, wherein an intermediate node of the first corrective filter assumes the value:

$$R(n)=Ap(n)-ER(n-1)-FR(n-2); \text{ and the output } Y(n)=R(n)+(B/A)R(n-1)+(C/A)R(n-2); \text{ and}$$

wherein A, B, C, E and F comprise the plurality of coefficients.

34. The method of claim 29, wherein a first intermediate node of the first corrective filter assumes the value:

$$L(n)=(A-1)p(n)+(B-E)p(n-1)+(C-F)p(n-2);$$

a second intermediate node assumes the value:

$$W(n)=L(n)-EW(n-1)-FW(n-2); \text{ and the output } Y(n)=p(n)+W(n); \text{ and}$$

wherein A, B, C, E and F comprise the plurality of coefficients.

35. The method of claim 29, wherein a first intermediate node of the first corrective filter assumes the value:

$$M(n)=p(n)-EM(n-1)-FM(n-2);$$

a second intermediate mode assumes the value:

$$V(n)=(A-1)M(n)+(B-E)M(n-1)+(C-F)M(n-2); \text{ and the output } Y(n)=p(n)+V(n); \text{ and}$$

wherein A, B, C, E and F comprise the plurality of coefficients.

36. The method of claim 29, wherein a first intermediate node of the first corrective filter assumes the value:

$$M(n)=(A-1)p(n)-EM(n-1)-FM(n-2);$$

a second intermediate node of the filter assumes the value:

$$V(n)=M(n)+[(B-E)/(A-1)]M(n-1)+[(C-F)/(A-1)]M(n-2)]; \text{ and the output } Y(n)=p(n)+V(n); \text{ and}$$

wherein A, B, C, E and F comprise the plurality of coefficients.

37. The method of claim 29, wherein a first intermediate node of the first corrective filter assumes the value:

$$M(n)=k(A-1)p(n)-EM(n-1)-FM(n-2);$$

a second intermediate node assumes the value:

$$V(n)=M(n)+[(B-E)/(A-1)]M(n-1)+[(C-F)/(A-1)]M(n-2); \text{ and the output } Y(n)=p(n)+(1/k)V(n); \text{ and}$$

wherein A, B, C, E and F comprise the plurality of coefficients, and k is a predetermined constant.

38. The method of claim 16, further comprising:

detecting, during operation of the data storage device, a frequency of the vibration from the source external to the data storage device.

39. The method of claim 38, wherein said detecting includes:

configuring a detection filter to scan the position signal across a range of frequencies, and, at each respective scanned frequency, recording an amplitude associated therewith; and determining whether any of the recorded amplitudes exceeds a predetermined threshold, thereby locating the corresponding frequency of the vibration.

40. The method of claim 38, further comprising:

configuring the first corrective filter to operate at the detected frequency of vibration from the source external to the data storage device.

41. The method of claim 40, wherein the same filter is used for the detection filter and the first corrective filter.

42. The method of claim 38, further comprising:

repeatedly detecting, during operation of the data storage device, the frequency of the vibration from the source external to the data storage device; and repeatedly configuring the first corrective filter to operate at the detected frequency of the vibration.

43. In a data storage device having a medium mounted for movement relative to an access element, and a servo system for controlling the position of the access element with respect to the medium, a method for reducing the effect, on a position signal in the servo system, of a vibration, comprising:

using a first corrective filter to reduce the effect of the vibration on the position signal by enhancing a control signal to the access element at a peak frequency of the vibration;

repeatedly engaging the first corrective filter, including repeatedly accessing a filter state vector as initial filter conditions as the first corrective filter is repeatedly engaged; and refreshing the filter state vector periodically with corresponding outputs from the first corrective filter, or with quieting values.

44. The method of claim 43, wherein the filter state vector is refreshed less than about 5 to 10 periods of rotation of the medium of the data storage device.

45. The method of claim 43, wherein said refreshing occurs during a power-on cycle of said data storage device.

46. A data storage device, comprising:

a medium mounted for movement relative to an access element;

a servo system for controlling a position of the access element with respect to the medium;

a system for reducing the effect of a vibration on a position signal in the servo system, including a detector for detecting, during operation of the data storage device, a frequency of the vibration of the medium.

47. The device of claim 46, wherein said detector includes:

a detection filter;

means for configuring the detection filter to scan the position signal across a range of frequencies, and, at each respective scanned frequency, recording an amplitude associated therewith; and means for determining whether any of the recorded amplitudes exceeds a predetermined threshold, thereby locating the corresponding frequency of the vibration.

48. The device of claim 47, wherein said means for configuring the detection filter includes, for each respective scanned frequency, means for using a plurality of filter coefficients determined primarily as a function of each respective scanned frequency.

49. The device of claim 46, further comprising:

a corrective filter to reduce the effect of the detected frequency of the vibration on the position signal.

50. The device of claim 49, further comprising:

means for configuring the corrective filter to operate at the detected frequency of the vibration.

51. The device of claim 50, wherein said means for configuring the corrective filter includes means for determining a plurality of filter coefficients as a function of the detected frequency of the vibration.

52. The device of claim 51, wherein the corrective filter is of the form $$Y(n)=Ap(n)+Bp(n-1)+Cp(n-2)-EY(n-1)-FY(n-2), \text{ where:}$$

n denotes a sampling time index;

p(n) is said position signal at each sampling time index n;

Y(n) is the corrective filter output at each sampling time index n; and

A, B, C, E and F comprise the plurality of filter coefficients.

53. The device of claim 52, wherein said means for determining a plurality of filter coefficients as a function of the detected peak frequency of the vibration includes means for using the relationships:

$$A=[1+a1+a2]/D;$$

$$B=[-2+2a2]/D;$$

$$C=[1-a1+a2]/D;$$

$$E=[-2+2b2]/D; \text{ and}$$

$$F=[1-b2]/D,$$

where:

$$a1 = 2\pi Z_a f^*;$$
$$a2 = (\pi f^*)(\pi f^*);$$
$$b1 = 2\pi Z_b f^*;$$
$$b2 = (\pi f^*)(\pi f^*);$$
$$D = [1+b1+b2];$$

Za, Zb are damping coefficients;
f* is related to the detected peak frequency of the vibration.

54. The device of claim 52, wherein an intermediate node of the filter assumes the value:

$$Q(n)=Ap(n)+Bp(n-1)+Cp(n-2); \text{ and the output } Y(n)=Q(n)-EY(n-1)-FY(n-2); \text{ and}$$

wherein A, B, C, E and F comprise the plurality of coefficients.

55. The device of claim 52, wherein an intermediate node of the filter assumes the value:

$$R(n)=p(n)-ER(n-1)-FR(n-2); \text{ and the output } Y(n)=AR(n)+BR(n-1)+CR(n-2); \text{ and}$$

wherein A, B, C, E and F comprise the plurality of coefficients.

56. The device of claim 52, wherein an intermediate node of the filter assumes the value:

$$R(n)=Ap(n)-ER(n-1)-FR(n-2); \text{ and the output } Y(n)=R(n)+(B/A)R(n-1)+(C/A)R(n-2); \text{ and}$$

wherein A, B, C, E and F comprise the plurality of coefficients.

57. The device of claim 52, wherein a first intermediate node of the filter assumes the value:

$$L(n)=(A-1)p(n)+(B-E)p(n-1)+(C-F)p(n-2);$$

a second intermediate node assumes the value:

$$W(n)=L(n)-EW(n-1)-FW(n-2); \text{ and the output } Y(n)=p(n)+W(n); \text{ and}$$

wherein A, B, C, E and F comprise the plurality of coefficients.

58. The device of claim 52, wherein a first intermediate node of the filter assumes the value:

$$M(n)=p(n)-EM(n-1)-FM(n-2);$$

a second intermediate mode assumes the value:

$$V(n)=(A-1)M(n)+(B-E)M(n-1)+(C-F)M(n-2); \text{ and the output } Y(n)=p(n)+V(n); \text{ and}$$

wherein A, B, C, E and F comprise the plurality of coefficients.

59. The device of claim 52, wherein a first intermediate node of the filter assumes the value:

$$M(n)=(A-1)p(n)-EM(n-1)-FM(n-2);$$

a second intermediate node of the filter assumes the value:

$$V(n)=M(n)+[(B-E)/(A-1)]M(n-1)+[(C-F)/(A-1)]M(n-2); \text{ and the output } Y(n)=p(n)+V(n); \text{ and}$$

wherein A, B, C, E and F comprise the plurality of coefficients.

60. The device of claim 52, wherein a first intermediate node of the filter assumes the value:

$$M(n)=(A-1)p(n)-EM(n-1)-FM(n-2);$$

a second intermediate node assumes the value:

$$V(n)=M(n)+[(B-E)/(A-1)]M(n-1)+[(C-F)/(A-1)]M(n-2); \text{ and the output } Y(n)=p(n)+V(n); \text{ and}$$

wherein A, B, C, E and F comprise the plurality of coefficients, and k is a predetermined constant.

61. A data storage device, comprising:
a medium mounted for movement relative to an access element;
a servo system for controlling the position of the access element with respect to the medium; and
a system for reducing the effect, on a position signal in the servo system, of a vibration from a source external to the data storage device, including
means for detecting, during operation of the data storage device, a frequency of vibration of the medium, and
a first corrective filter for reducing the effect of the vibration on the position signal.

62. The device of claim 61, further comprising:
means for configuring the first corrective filter to operate at a frequency of the vibration from the source external to the data storage device.

63. The device of claim 62, further comprising:
means for repeatedly engaging the first corrective filter, including means for repeatedly accessing a filter state vector, as initial filter conditions as the first corrective filter is repeatedly engaged.

64. The device of claim 63, further comprising:
means for refreshing the filter state vector periodically with corresponding outputs from the first corrective filter, or with quieting values.

65. The device of claim 64, wherein the filter state vector is refreshed less than about every 5 to 10 periods of rotation of the medium of the data storage device.

66. The device of claim 63, wherein the means for repeatedly accessing includes means for using a counter to control access to corresponding values in the filter state vector as initial filter conditions as the first corrective filter is repeatedly engaged, wherein the counter wraps at a value corresponding to a period of the vibration from the source external to the data storage device.

67. The device of claim 61, further comprising:
a second corrective filter for reducing the effect, on the position signal, of a vibration from a source internal to the data storage device.

68. The device of claim 67, further comprising:
means for configuring the second corrective filter to operate at a frequency of the vibration from the source internal to the data storage device.

69. The device of claim 68, further comprising:
means for repeatedly engaging the first and second corrective filters, including means for accessing first and second filter state vectors as initial filter conditions as the filters are repeatedly engaged.

70. The device of claim 69, wherein the means for repeatedly accessing includes:
means for using a first counter to control access to corresponding values in the first filter state vector as initial filter conditions as the first corrective filter is repeatedly engaged; and using a second counter to access corresponding values in the second filter state vector as initial filter conditions as the second corrective filter is repeatedly engaged.

71. The device of claim 70, wherein the first counter wraps at a value corresponding to a period of the vibration from the source external to the data storage device, and wherein the second counter wraps at a different value corresponding to a period of the vibration from the source internal to the data storage device.

72. The device of claim 69, wherein the source of the frequency of vibration internal to the data storage device comprises rotation of the medium about a spindle thereof, and the source of the frequency of vibration external to the data storage device comprises rotation of a second medium about a spindle of a second data storage device external to the first data storage device.

73. The device of claim 62, wherein said means for configuring the first corrective filter includes means for determining a plurality of filter coefficients as a function of the frequency of the vibration.

74. The device of claim 73, wherein the first corrective filter is of the form $$Y(n)=Ap(n)+Bp(n-1)+Cp(n-2)-EY(n-1)-FY(n-2), \text{ where:}$$

n denotes a sampling time index;

p(n) is said position signal at each sampling time index n;

Y(n) is the corrective filter output at each sampling time index n; and

A, B, C, E and F comprise the plurality of filter coefficients.

75. The device of claim 74, wherein said means for determining a plurality of filter coefficients as a function of the detected peak frequency of the vibration includes means for using the relationships:

$$A=[1+a1+a2]/D;$$

$$B=[-2+2a2]/D;$$

$$C=[1-a1+a2]/D;$$

$$E=[-2+2b2]/D; \text{ and}$$

$$F=[1-b2]/D,$$

where:

$$a1=2\pi Zaf^*;$$

$$a2=(\pi f^*)(\pi f^*);$$

$$b1=2\pi Zbf^*;$$

$$b2=(\pi f^*)(\pi f^*);$$

$$D=[1+b1+b2];$$

Za, Zb are damping coefficients;

f* is related to the frequency of the vibration.

76. The device of claim 74, wherein an intermediate node of the first corrective filter assumes the value:

$$Q(n)=Ap(n)+Bp(n-1)+Cp(n-2); \text{ and the output } Y(n)=Q(n)-EY(n-1)-FY(n-2); \text{ and}$$

wherein A, B, C, E and F comprise the plurality of coefficients.

77. The device of claim 74, wherein an intermediate node of the first corrective filter assumes the value:

$$R(n)=p(n)-ER(n-1)-FR(n-2); \text{ and the output } Y(n)=AR(n)+BR(n-1)+CR(n-2); \text{ and}$$

wherein A, B, C, E and F comprise the plurality of coefficients.

78. The device of claim 74, wherein an intermediate node of the first corrective filter assumes the value:

$$R(n)=Ap(n)-ER(n-1)-FR(n-2); \text{ and the output } Y(n)=R(n)+(B/A)R(n-1)+(C/A)R(n-2); \text{ and}$$

wherein A, B, C, E and F comprise the plurality of coefficients.

79. The device of claim 74, wherein a first intermediate node of the first corrective filter assumes the value:

$$L(n)=(A-1)p(n)+(B-E)p(n-1)+(C-F)p(n-2);$$

a second intermediate node assumes the value:

$$W(n)=L(n)-EW(n-1)-FW(n-2); \text{ and the output } Y(n)=p(n)+W(n); \text{ and}$$

wherein A, B, C, E and F comprise the plurality of coefficients.

80. The device of claim 74, wherein a first intermediate node of the first corrective filter assumes the value:

$$M(n)=p(n)-EM(n-1)-FM(n-2);$$

a second intermediate mode assumes the value:

$$V(n)=(A-1)M(n)+(B-E)M(n-1)+(C-F)M(n-2); \text{ and the output } Y(n)=p(n)+V(n); \text{ and}$$

wherein A, B, C, E and F comprise the plurality of coefficients.

81. The device of claim 74, wherein a first intermediate node of the first corrective filter assumes the value:

$$M(n)=(A-1)p(n)-EM(n-1)-FM(n-2);$$

a second intermediate node of the filter assumes the value:

$$V(n)=M(n)+[(B-E)/(A-1)]M(n-1)+[(C-F)/(A-1)]M(n-2); \text{ and the output } Y(n)=p(n)+V(n); \text{ and}$$

wherein A, B, C, E and F comprise the plurality of coefficients.

82. The device of claim 74, wherein a first intermediate node of the first corrective filter assumes the value:

$$M(n)=k(A-1)p(n)-EM(n-1)-FM(n-2);$$

a second intermediate node assumes the value:

$$V(n)=M(n)+[(B-E)/(A-1)]M(n-1)+[(C-F)/(A-1)]M(n-2); \text{ and the output } Y(n)=p(n)+(1/k)V(n); \text{ and}$$

wherein A, B, C, E and F comprise the plurality of coefficients, and k is a predetermined constant.

83. The device of claim 61, further comprising:

a detector for detecting, during operation of the data storage device, a frequency of the vibration from the source external to the data storage device.

84. The device of claim 83, wherein said detector includes:

a detection filter;
means for configuring the detection filter to scan the position signal across a range of frequencies, and, at each respective scanned frequency, recording an amplitude associated therewith; and
means for determining whether any of the recorded amplitudes exceeds a predetermined threshold, thereby locating the corresponding frequency of the vibration.

85. The device of claim 83, further comprising:
means for configuring the first corrective filter to operate at the detected frequency of vibration from the source external to the data storage device.

86. The device of claim 85, wherein the same filter is used for the detection filter and the first corrective filter.

87. The device of claim 83, further comprising:
means for repeatedly detecting, during operation of the data storage device, the frequency of the vibration from the source external to the data storage device; and
means for repeatedly configuring the first corrective filter to operate at the detected frequency of the vibration.

88. A data storage device comprising:
a medium mounted for movement relative to an access element;
a servo system for controlling the position of the access element with respect to the medium; and
a system for reducing the effect, on a position signal in the servo system, of a vibration, including
a first corrective filter to reduce the effect of the vibration on the position signal by enhancing a control signal to the access element at a peak frequency of the vibration;
means for repeatedly engaging the first corrective filter, including means for repeatedly accessing a filter state vector as initial filter conditions as the first corrective filter is repeatedly engaged; and
means for refreshing the filter state vector periodically with corresponding outputs from the first corrective filter, or with quieting values.

89. The device of claim 88, wherein the filter state vector is refreshed less than about 5 to 10 periods of rotation of the medium of the data storage device.

90. The device of claim 88, wherein said refreshing occurs during a power-on cycle of said data storage device.

91. The method of claim 1, further comprising enhancing a control signal to the access element at the detected frequency of the vibration.

92. The method of claim 16, further comprising enhancing a control signal to the access element at a frequency of the vibration.

93. The data storage device of claim 46, further comprising means for enhancing a control signal to the access element at the detected frequency of the vibration.

94. The data storage device of claim 61, further comprising means for enhancing a control signal to the access element at a frequency of the vibration.

95. In a data storage device having a medium mounted for movement relative to an access element, and a servo system for controlling a position of the access element with respect to the medium, a method for reducing the effect of a vibration on a position signal in the servo system, comprising:
detecting, during operation of the data storage device, a frequency of the vibration of the medium; and
responsive to said detecting, modifying positioning of the access element relative to the medium to force the access element to more closely track movement of the medium.

96. In a data storage device having a medium mounted for movement relative to an access element, and a servo system for controlling the position of the access element with respect to the medium, a method for reducing the effect, on a position signal in the servo system, of a vibration from a source external to the data storage device, comprising:
detecting, during operation of the data storage device, a frequency of vibration of the medium;
responsive to said detecting, modifying positioning of the access element relative to the medium to force the access element to more closely track movement of the medium; and
wherein said modifying includes using a first corrective filter to reduce the effect of the vibration on the position signal.

97. In a data storage device having a medium mounted for movement relative to an access element, and a servo system for controlling the position of the access element with respect to the medium, a method for reducing the effect, on a position signal in the servo system of a vibration, comprising:
detecting, during operation of the data storage device, a frequency of vibration of the medium;
responsive to said detecting, modifying positioning of the access element relative to the medium to force the access element to more closely track movement of the medium;
wherein said modifying includes:
using a first corrective filter to reduce the effect of the vibration on the position signal by enhancing a control signal to the access element at a peak frequency of the vibration;
repeatedly engaging the first corrective filter, including repeatedly accessing a filter state vector as initial filter conditions as the first corrective filter is repeatedly engaged; and
refreshing the filter state vector periodically with corresponding outputs from the first corrective filter, or with quieting values.

98. A data storage device, comprising:
a medium mounted for movement relative to an access element;
a servo system for controlling a position of the access element with respect to the medium;
a system for reducing the effect of a vibration on a position signal in the servo system, including
a detector for detecting, during operation of the data storage device, a frequency of the vibration of the medium; and
wherein the servo system includes means for modifying positioning of the access element relative to the medium responsive to said detecting a vibration, to force the access element to more closely track movement of the medium.

99. A data storage device, comprising:
a medium mounted for movement relative to an access element;
a servo system for controlling the position of the access element with respect to the medium; and
a system for reducing the effect, on a position signal in the servo system, of a vibration from a source external to the data storage device, including
means for detecting, during operation of the data storage device, a frequency of vibration of the medium;
responsive to said detecting, means for modifying positioning of the access element relative to the medium to force the access element to more closely track movement of the medium; and wherein the means for modifying includes a first corrective filter for reducing the affect of the vibration on the position signal.

100. A data storage device comprising:

a medium mounted for movement relative to an access element;

a servo system for controlling the position of the access element with respect to the medium; and a system for reducing the effect, on a position signal in the servo system, of a vibration, including:

means for detecting, during operation of the data storage device, a frequency of vibration of the medium;

means for modifying positioning of the access element relative to the medium responsive to said detecting to force the access element to more closely track movement of the medium; and wherein the means for modifying includes:

a first corrective filter to reduce the effect of the vibration on the position signal by enhancing a control signal to the access element at a peek frequency of the vibration;

means for repeatedly engaging the first corrective filter including means for repeatedly accessing a filter state vector as initial filter conditions as the first corrective filter is repeatedly engaged; and means for refreshing the filter state vector periodically with corresponding outputs from the first corrective filter, or with quieting values.

* * * * *